United States Patent [19]

Dermer

[11] Patent Number: 5,668,931
[45] Date of Patent: Sep. 16, 1997

[54] METHOD FOR AUTOMATIC TRAP SELECTION FOR CORRECTING FOR PLATE MISREGISTRATION IN COLOR PRINTING

[76] Inventor: Richard A. Dermer, 4 Enfield Dr., Andover, Mass. 01810

[21] Appl. No.: 40,724

[22] Filed: Mar. 31, 1993

[51] Int. Cl.[6] .................................................. G06K 15/00
[52] U.S. Cl. ........................... 395/104; 395/109; 395/101
[58] Field of Search .................................. 395/104, 109, 395/131, 101; 101/395, 463.1, 45.3, 453

[56] References Cited

U.S. PATENT DOCUMENTS

| | | | |
|---|---|---|---|
| 4,437,403 | 3/1984 | Greiner | 101/248 |
| 4,583,116 | 4/1986 | Hennig et al. | 358/515 |
| 5,113,249 | 5/1992 | Yosefi | 358/515 |
| 5,252,995 | 10/1993 | Trask et al. | 347/119 |
| 5,295,236 | 3/1994 | Bjorge et al. | 395/134 |

Primary Examiner—Raymond J. Bayerl
Assistant Examiner—Tracy M. Legree

[57] ABSTRACT

A method for automatic compensation for misregistration of printing plates in printing of polychromatic document pages or images, in which a trapping map image is superimposed upon the structured graphic image representing the layout of the document page or image from which it is derived, so as to prevent light leaks and other errors at the boundaries between color regions within the image. Traps are selected automatically and applied to a boundary map comprising the set of boundaries between regions of different color of the original image. The selection process uses the results of a plurality of separate methods for ranking possible traps each of which is assigned an overall score by means of a weighted sum of the ranks obtained by each of the separate methods, with the resulting score used as the basis for automatic trap selection among the set of possible traps. The weights applicable to the score are previously determined according to several methods, such as a least squares fit procedure in which traps are judged subjectively by "experts" and correlated with the ranks obtained by each of the separate methods.

14 Claims, 23 Drawing Sheets

METHOD FOR AUTOMATIC TRAP SELECTION FOR CORRECTING FOR PLATE MISREGISTRATION IN COLOR PRINTING

CROSS-REFERENCE TO RELATED APPLICATIONS

The present application is related to the applications of Richard A. Dermer for "Method for Automatic Trap Selection for Correcting for Plate Misregistration in Color Printing" and of Richard A. Dermer and Edward C. Reifenstein, III for "Method for Determining color Boundaries for Correcting for Plate Misregistration in color Printing" filed simultaneously herewith and assigned to the same assignee.

BACKGROUND OF THE INVENTION

The field to which the invention applies is the electronic processing of graphic images to produce multi-color output using offset or other printing methods. Images are obtained electronically by digital scanning of photographic material and combined with "structured graphics" to provide composed images or pages which are then separated into monochromatic images each corresponding to an ink to be used in the printing process. Typically, four process color inks, cyan, magenta, yellow and black are used, although special "spot" colors can be used instead of or in addition to the process color inks. The separated images can then be output to photographic films from which printing plates are made. Alternatively, the separated images can be used to produce engraved cylinders from which gravure prints can be made.

The layout of a page or graphic image to be printed as described above depends upon combination of "structured graphics" according to a pre-established graphic design. The structured graphics are contiguous regions of color which represent a succession of graphic objects imaged on the printing medium (e.g. the "paper"). The objects so imaged are polygon shapes which can be isolated from each other, can abut one another at one or more points, can partially overlap one another, or can completely overlap one another. The resulting printed page or graphic image is therefore made up of a patchwork of polygon shapes representing the graphic objects, some of which are "clipped" by objects imaged later in the succession.

The result of abutting or overlapping polygon shapes is a boundary between adjacent regions of color which under ideal printing conditions should have zero width. The "colors" which fill the polygon shapes can be solid colors, tints, degradés, contone images, or "no fill" (i.e., the paper with no ink applied). In general, the "colors" represented in these adjacent regions are printed using more than one ink. In practice therefore, the realization of a zero width boundary between regions of different color is impossible as a result of small but visible misregistration problems from one printing plate to another. The error is manifested as a "light leak" or as a visible boundary of an undesired color.

Methods for correcting for this misregistration are well known in the prior art. The general approach is to expand one of the regions which abut so as to fill the gap or misregistration border region with a color determined so as to minimize the visual effect when printed. Borders which are expanded from a region of one color to another in this manner are said to be "spread". A border which has been so expanded is referred to as a "trap", and the zone within which color is added is called the "trap zone".

Commonly used methods for automatic trapping of digital images rely on images which have been first scanned and are stored internally as a sequence of (high resolution) scan lines each containing individual scan elements or pixels. These methods process each raster line in sequence and compare one or more adjacent pixels to determine color boundaries, and apply rules for determining whether or not to create a trap at such boundaries, and finally apply a second set of rules to determine the nature of the trap if one is to be created.

For example, the method of Taniguchi, described in U.S. Pat. No. 4,931,861, uses two rasterized images representing abutting or overlapping objects within an image field to define a third binary image representing the map of the pixels which make up the borders between the first and second images. These three images are superimposed, pixel by pixel, to create a fourth and final binary image. The method of Hennig et al., described in U.S. Pat. No. 4,583,116 is also defined on a pixel basis, in as much as the images described are obtained by opto-electrical scanning source images. The patent also teaches a method for determining the boundary color for the (pixel-based) boundary separating the color regions. The method of Darby et at., described in U.S. Pat. No. 4,725,966, again defined on a pixel basis, uses a mask which is moved, one resolution element at a time, to evaluate the presence or absence of (pixel) colors upon which a positive or negative spread decision is based.

The method of Yosefi, described in U.S. Pat. No. 5,113,249 uses a set of automated rules as the basis for deciding, for each pair of abutting or overlapping shapes whether or not to create a trap (an overlap region referred to as a "frame"), and, if so, the nature of the trap to create. The preferred embodiment described by Yosefi makes use of scanned data, and processes each line of pixels in order, comparing for each pixel three pixels from the previous scan line and two pixels from the same line to determine if a color change has occurred. The decisions regarding whether or not to create a trap, and the nature of such a trap if created are imbedded within the processing sequence, making use of criteria established prior to the onset of processing.

A commercially available product, "TrapWise", from Aldus Corporation, Seattle Wash., also makes use of a raster approach to trapping. In this product, the processing time is proportional to the number of resolution elements, thereby increasing quadratically with resolution, and leading to greater computation times for high device resolution, e.g., 3600 dots per inch (d.p.i.). Furthermore, traps are created with this package using pre-set rules, and are not editable by a user without the requirement for repeating the computation.

The trapping methods described in the above cited prior art references have two common features: The first is the processing of images represented in raster form. This places a requirement for extra processing steps in images which constitute primarily structured graphics or which combine structured graphics with contone images. Such images must first be rasterized at the output resolution, and then the appropriate line-scan algorithm applied. As a result of the number of edge boundaries involved (at output resolutions of for example 3600 d.p.i.), a substantial amount of redundant computation is required, particularly if a trap is created at each edge.

The second common feature of prior art methods is the necessity to make and apply trapping decisions within the processing based upon pre-established criteria. For raster based processing at high output device resolution, the potential number of pixel-to-pixel color transitions is large due to repetition of transitions corresponding to a single color region border shared by many scan lines. In U.S. Pat. No. 5,113,249, the decision to make a trap is conditional, so the number of color pairs to be considered is reduced below that which would be required if all color pairs were automatically trapped. Since the decision to make a trap is applicable only to generic color pairs encountered within a particular image, only color pairs processed in the first pass through the raster data can be subject to modification without reprocessing the raster at least once. To address other color pairs (i.e., to repeat the decision process), another pass is required. The method of the above patent does not therefore permit interactive modification and display of trapping decision modifications, since iterative application or modification of trapping decision rules is impractical when processing must generally be repeated (at least once through the entire raster) with each change.

Many rule-based methods exist in the prior art for automatic determination of the particular trap to be specified for a given combination of bounding colors. For example, in U.S. Pat. No. 5,113,249, a set of logical tests is used in sequence to differentiate between pre-established generic color-pair categories, with a rule applied to each color pair. Such built-in role systems attempt to replicate the human aesthetic judgement used in manual specification of traps and each can provide results satisfactory to an "expert" user in most cases while failing to do so in other special situations. Without a means for configuring the automatic trap selection method, a user is forced to rely on manual trap specification, even for routine operations.

The specification of a trap at the boundary between two color regions does not in itself eliminate the misregistration of printing plates, but reduces the visual effect of misregistration within the trap zone through proper choice of the trap operation. In the event of plate misregistration involving a color separation for which a trap has been specified, additional "secondary" effects occur. The methods described in the prior art provide no information from which such effects can be visualized during the process of trap specification, and therefore necessitate a "trial and error" approach.

It is therefore a general object of the present invention to permit the direct processing of structured graphic objects of an original image without the requirement for an initial rasterization process to specify trap characteristics at the boundaries between clipping or abutting regions of color considered as adjacent polygons each made up of a path of sequential line segments and filled by a solid color, a tint, a degradé, a contone image, or no fill (the blank "paper"), thereby producing a graphic image containing all such boundaries of the original image.

It is a further object of the present invention to generate a graphic image containing all boundaries of the original image in such a manner that its basic geometry is independent of any decisions regarding whether or not traps between individual regions are necessary, or the nature of such traps, thereby providing a wide range of options based upon pre-established rules or direct user interaction which can be applied iteratively without the necessity for recomputing the aforementioned geometry.

It is a further object of the invention to provide a system which allows trapping of document pages and images on a production basis with a user interface permitting display of the trapped and untrapped data, and the selection of trap decision methods ranging from fully automatic to completely manual interactive modes.

It is a still further object of the invention to permit the user of a trapping system to employ graphic user interface tools for direct manipulation of the borders between adjacent color regions on a trial basis and to observe the effects of such manipulation without the necessity of recomputing the aforementioned graphic image containing all boundaries of the original image, and before committing to the final output processing of the data being manipulated.

It is a still further object of the invention to include in the user interface of a trapping system an indication for any selected color region bounding other color regions a display of all possible effects of misregistration of printing plates which can occur for the selected color region as a result of no trapping, and as a result of any candidate trapping decision applied to all boundaries of the selected color region.

It is a still further object of the invention to include in the user interface of a trapping system an indication for any selected boundary between adjacent color regions a display of all possible secondary misregistration effects which would result from any candidate trapping decision.

It is a still further object of the invention to provide automatic specification of traps by user selection from more than one trap selection methods, or use of a combination of more than one trap selection method, based upon aesthetic judgement or special situations.

It is a feature of the present invention that the processing time required for generation of the trapping map is in general reduced in comparison to raster methods carried out at high device resolution, since the number of boundaries grows linearly with resolution while the number of pixels to be scanned in a raster grows quadratically.

SUMMARY OF THE INVENTION

A method and apparatus are disclosed for processing digital data representing a structured graphic image to compensate for the printing plate misregistration. As an aid to understanding the discussion to follow, the terms defined herein apply to the entire specification and claims, and are indicated by small capitalization. The term STRUCTURED GRAPHIC IMAGE means a document page description, i.e., a page layout which can contain linework, typographic or display text, tints and degradés, and regions to be filled with (halftone-screened) continuous-tone images when they are rasterized for output. The digital data format for this image can be a data description such as that of the PICT (a trademark of Apple Computer, Inc.) data format, or it can be a procedural description such as that of the "PostScript" (a trademark of Adobe Systems, Inc.) Page Description Language.

The first step is to generate from the given STRUCTURED GRAPHIC IMAGE a sequence of GRAPHIC OBJECT DESCRIPTIONS making up a DISPLAY LIST, in which each GRAPHIC OBJECT DESCRIPTIONS in the DISPLAY LIST is a polygon definition. A GRAPHIC OBJECT DESCRIPTION refers to a single CLOSED POLYGON, which is defined as any of the following: (1) a single region containing an interior fill color; (2) two or more overlapping regions having the same interior fill color; or, (3) two or more disjoint regions having the same interior fill color. The GRAPHIC OBJECT DESCRIPTION for each CLOSED POLYGON is made up of the coordinates of all of the vertices which define the CLOSED POLYGON, along with the lines connecting these vertices and the fill color of the interior of the enclosed region(s). The spatial coordinates of the line segments defining each CLOSED POLYGON can be expressed in any two-dimensional rectilinear coordinate system, and the line segments themselves can be "vertical", "horizontal", or "slanted" with respect to the chosen coordinate system. For the purposes of this discussion, a coordinate system is used with X- and Y-values ("horizontal" and "vertical" respectively). Of particular importance to the invention is the fact that, through an appropriate rotation of coordinates applicable to the entire set of GRAPHIC OBJECT DESCRIPTIONS making up the DISPLAY LIST, a new coordinate system can be obtained in which there exist no "horizontal" lines. The order of the GRAPHIC OBJECT DESCRIPTIONS in the DISPLAY LIST is the order in which they are to be rendered in the output rasterization process, with the first GRAPHIC OBJECT DESCRIPTION describing the first object to be rendered, and the last GRAPHIC OBJECT DESCRIPTION describing the last to be rendered.

The graphic objects described in the DISPLAY LIST represent polygon shapes located as they are to appear in the output medium when imaged, with each polygon in the sequence clipping those previously so located in this space. As used herein, the term CLIPPING by an opaque polygon shape (the "clipping polygon") means the partial or complete obscuration of polygon shapes (the "clipped polygons") whose boundaries it overlaps with the resultant "hiding" of boundaries contained within the region of overlap. After removal of hidden lines, there remains a patchwork of polygon shapes representing the different color regions which are to appear in the final image. The set of boundaries between adjacent polygon regions is identified and collected together to form a single graphic object hereinafter referred to as a BOUNDARY MAP. The BOUNDARY MAP is a geometrical description of all straight line segments making up the above boundaries without specification of stroke characteristics (width, offset, shape and fall color) and therefore independent of any trapping decisions to be made later and which are to be used to determine such characteristics. The computation time required to construct the BOUNDARY MAP is linearly proportional to the total number of line segments making it up, and is therefore more efficient than raster methods or methods which compare object boundaries with those of other objects.

After construction of the BOUNDARY MAP, the stroke width, offset and fill characteristics are defined for each of the line segments of which it is comprised. Offsetting the stroke of a line segment towards or away from one of the clipped polygons for which the line segment forms a boundary edge causes the color region from which the offset occurs to be spread towards the region to which the offset occurs. The effects achieved depend in practice upon the combinations of the various inks used for the colors involved according to predefined rules or user interaction. Assignment of stroke characteristics to each line segment of the BOUNDARY MAP yields a TRAPPING MAP as a graphic object to be superimposed as a TRAPPING MAP IMAGE on top of the original STRUCTURED GRAPHIC IMAGE from which it was derived. Stroke width and offset can be specified manually by direct user interaction, or automatically using stored parameters. As used herein, manual interaction with the system can include combinations of keyboard entries and mouse, pen, tablet, etc. "picks" on elements of a graphical information display.

The trap specification step can be carried out automatically, or manually through direct user interaction. The automatic trap selection method ranks all possible trap decisions for a given color pair according to a weighted average of ranks obtained by multiple ranking methods, utilizing user-specified weights. In the manual interaction mode, a CANDIDATE TRAPPING MAP can be viewed at a user interface display and manipulated directly by specification of trap color, stroke width and offset for selected object boundaries, selected objects, or for all objects of a given color. New or modified trap specifications are applied to the previously derived BOUNDARY MAP to generate a new CANDIDATE TRAPPING MAP, with the effects of the changes immediately visible at the user interface display.

The next step is to add the GRAPHIC OBJECT DESCRIPTION of the TRAPPING MAP to the end of the DISPLAY LIST of GRAPHIC OBJECT DESCRIPTIONS making up the original STRUCTURED GRAPHIC IMAGE so as to ensure that the TRAPPING MAP graphic object is the last object rendered in the output process, i.e., it is superimposed upon the STRUCTURED GRAPHIC IMAGE when finally output. This can be accomplished either by appending the TRAPPING MAP graphic object description to the end of the DISPLAY LIST described previously followed by conversion of the resulting augmented DISPLAY LIST to the digital data format required for the output rasterization system, or alternatively, conversion of the TRAPPING MAP GRAPHIC OBJECT DESCRIPTION to the output format and appending it to end of the original image data file. In either case, the result is a TRAPPED IMAGE DATA FILE, representing the original STRUCTURED GRAPHIC IMAGE with the TRAPPING MAP superimposed upon it.

The final step is the output processing of the TRAPPED IMAGE DATA FILE by color separation and rasterization in the manner appropriate for the selected printing method.

BRIEF DESCRIPTION OF THE DRAWINGS

The invention will be best understood from a detailed description of a preferred embodiment thereof, selected for purposes of illustration, and presented with reference to the accompanying drawings, in which.

DETAILED DESCRIPTION OF A PREFERRED EMBODIMENT

Figure 1:
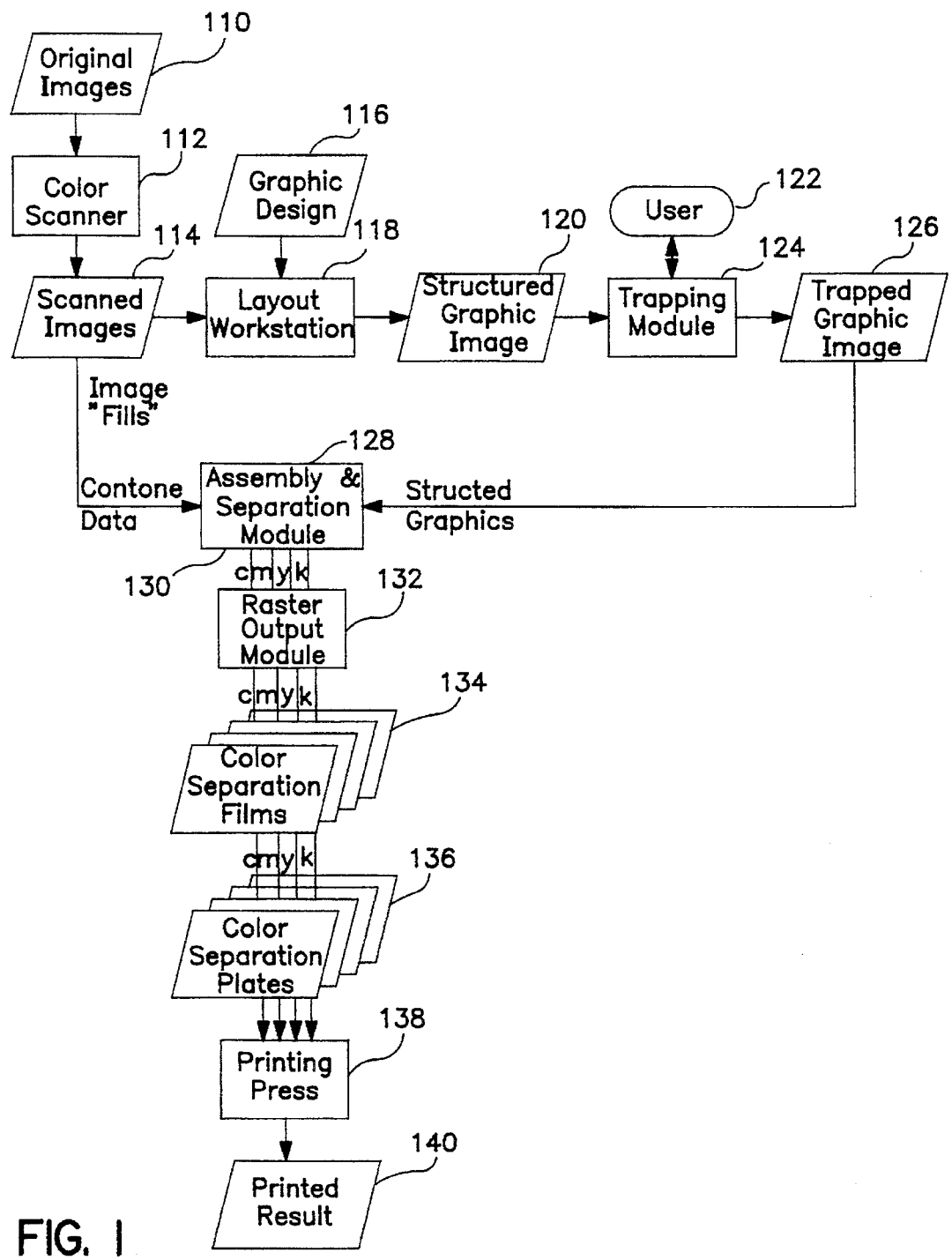
FIG. 1 is a block diagram of the processing steps associated with electronic prepress processing of a graphic image.

Turning now to the drawings, the steps associated with electronic prepress processing of a document page or graphic image is shown in FIG. 1. In the figure, a graphic design 116 is used to construct a STRUCTURED GRAPHIC IMAGE 120 representing the layout of graphic objects on the document page or image to be printed. The STRUCTURED GRAPHIC IMAGE 120 contains the line work, tints, degradés, typographic and display text, and regions to be filled with (halftone-screened) continuous tone images at output. The continuous tone ("contone") images 114 used for this purpose are scanned from original artwork or photographs 110 using a color scanner 112.

The trapping procedure takes place within the trapping module 124, which uses the STRUCTURED GRAPHIC IMAGE 120 as input, and produces a TRAPPED GRAPHIC IMAGE 126 compensated for potential misregistration problems. The procedure can operate automatically or under optional control of user 122 through a user interface to the trapping module 124. The trapped graphic image 126 is input to an assembly and separation module 128, which creates color-separated images including the screened halftone representations of scanned images 114 used as the "full color" for regions of the document page layout in which they are to appear. In the example of FIG. 1, four process color separations 130, designated c (cyan), m (magenta), y (yellow) and k (black) are shown, although in practice special "spot" color inks, varnishes, embossing, etc. can be used instead of or in addition to the process colors 130.

The color-separated (monochrome) versions of the assembled document page 130 are rasterized and recorded on film by a raster output module 132 yielding a set of color-separation films 134, from which color separation plates 136 are made, one for each of the inks to be used by the printing press 138 in final printing of the resultant document page 140.

Figure 2A:
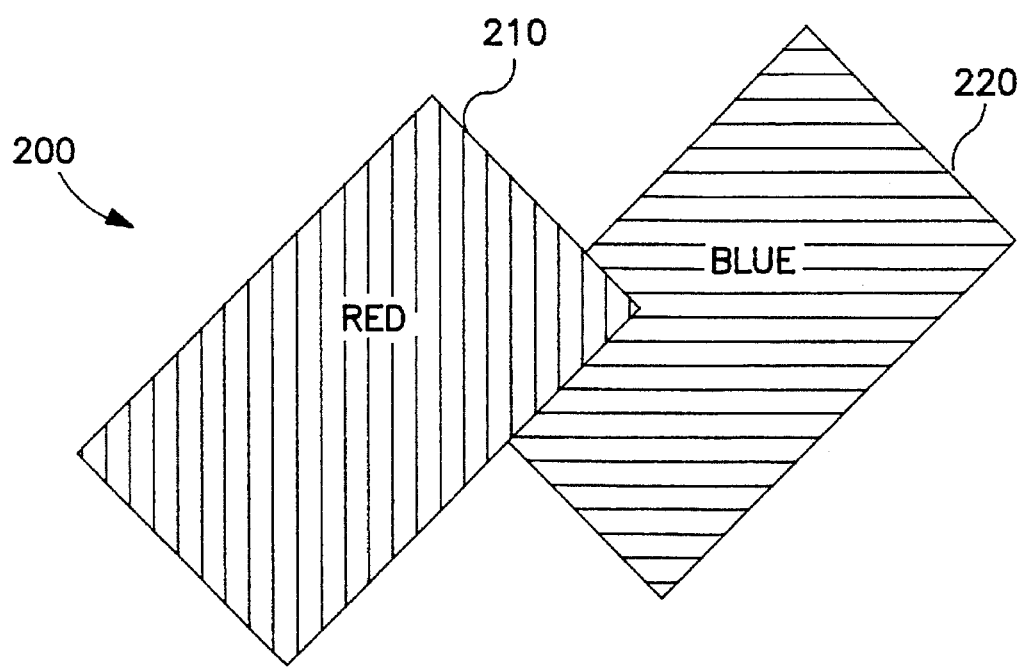
FIG. 2A and 2B demonstrate the effect of misregistration of monochromatic printing plates used for printing an image containing two simple graphic objects.
Figure 2B:
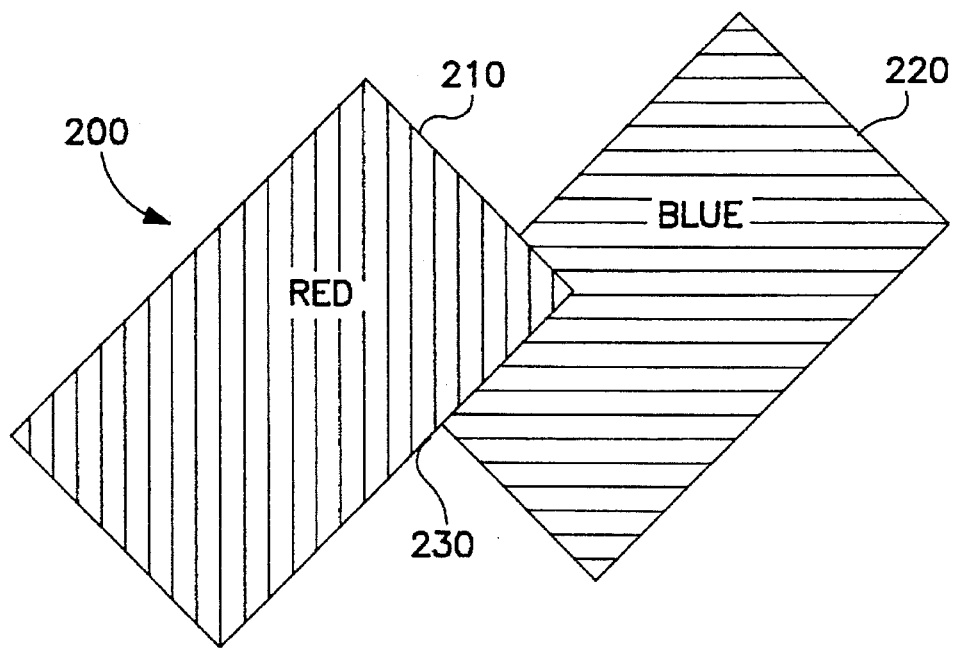

In FIG. 2 and the following figures, a simple example of a STRUCTURED GRAPHIC IMAGE 200 is shown, for the purpose of illustration. The STRUCTURED GRAPHIC IMAGE 200 is made up of two rectangular objects, a "red" object 210 which partially obscures a "blue" object 220. In FIG. 2A, the printed result is shown as it would appear with perfect registration. In FIG. 2B, the printed result is shown in the case of a slight misregistration of the printing plates used to print the (two or more) inks required. If "spot" colors are used for the "red" and "blue" inks, the example shows the effect of a slight shift of the "blue" plate up and to the right with respect to the "red" plate, resulting in a visible white line 230 at the boundary between the red region 210 and the blue region 220. Note that herein the term "white" refers to the color of the medium on which the image is printed. If the process colors cyan, magenta, yellow and black are used, the example shows the effect of a slight shift of the cyan plate up and to the right with respect to the magenta plate, resulting in a visible yellow line 230 (assuming no black component of the colors "red" and "blue").

Figure 3A:
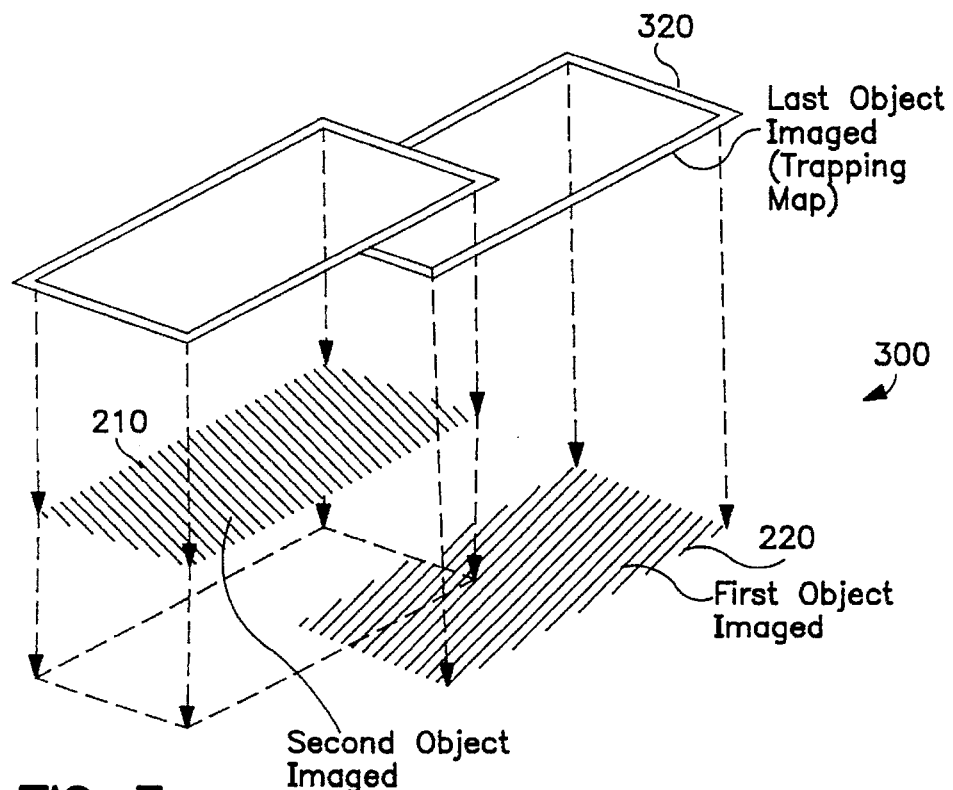
FIG. 3A and 3B illustrate the use of a TRAPPING MAP IMAGE superimposed upon an image subject to the misregistration effects of FIG. 2B.
Figure 3B:
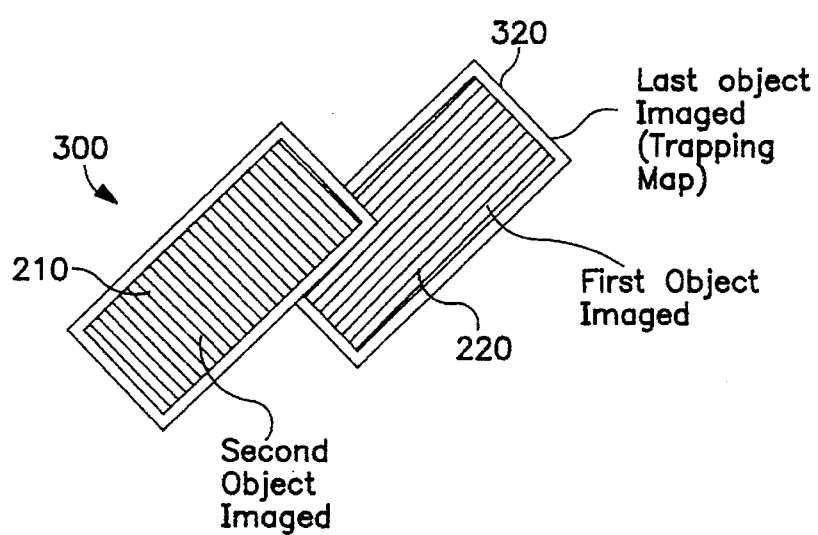

FIG. 3A illustrates the logical imaging model of image 300 of FIG. 2 after superimposition of the TRAPPING MAP 320, in which the "blue" rectangle 220 is the first object imaged and the "red" rectangle 210 is the second object imaged, partially obscuring or "clipping" the first rectangle 220. The appearance of the resulting image 300 is shown in FIG. 3B. In FIG. 3A and 3B, the TRAPPING MAP is shown as a solid black outline; in practice, the stroke width, offset, and fill color of the outline 320 is determined by pre-established criteria or by user 122 through a user interface to the trapping module 124 of FIG. 1.

Figure 4:
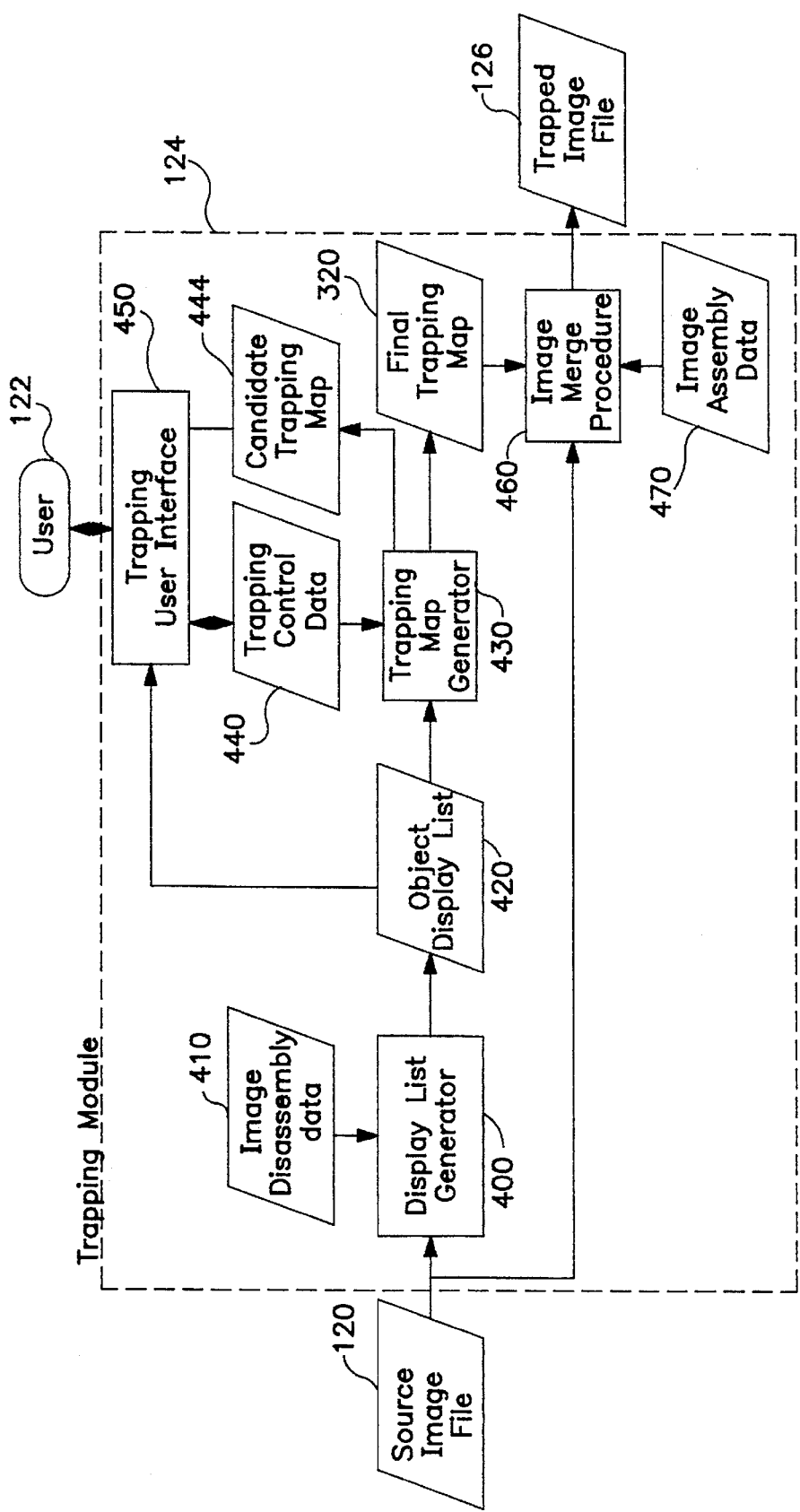
FIG. 4 is a block diagram showing the processing steps associated with a trapping module.

FIG. 4 is an explosion of the trapping module 124 of FIG. 1 showing the processing steps. The source image file 120 containing the STRUCTURED GRAPHIC IMAGE representing the document page layout is input to a DISPLAY LIST generator 400, which converts the source image to an object DISPLAY LIST ordered according to the sequence in which the objects are to be imaged. The DISPLAY LIST generator 400 makes use of information specific to the data format of the source image file 120 to perform the "disassembly" of the image data to form the object DISPLAY LIST 420. All graphic elements of the source image are added to the DISPLAY LIST as closed, borderless polygons filled with a color. For example, ruled lines are described as closed polygons formed by rectangles with one dimension very much smaller than the other.

For the purpose of discussion only, the data format of the source image file 120 is considered to be the PostScript level 2 language of Adobe Systems, Inc., or a functional equivalent thereof. The DISPLAY LIST generation process of module 400 is accomplished by a standard PostScript level 2 interpreter, making use of a set of PostScript procedure definitions prepended to the source image file 120 to redefine the standard PostScript imaging operators in order to write the GRAPHIC OBJECT DESCRIPTIONS making up the DISPLAY LIST 420 to a data file instead of performing their usual rendering and rasterization operations. In this case the disassembly data 410 is a data file making up the sequence of PostScript source statements making up this preamble.

The TRAPPING MAP generator 430 places the GRAPHIC OBJECT DESCRIPTION of the DISPLAY LIST within a defined space representing the two-dimensional medium to which the image is to be output, with each object clipping those objects placed before it in this space and being clipped by those placed after it. When all objects have been so placed, the boundaries between regions of different fall color are identified, and the coordinates of the start and end points of the set of line segments defining these boundaries can be combined with stroke width, offset, and fill information contained in an auxiliary TRAPPING CONTROL DATA SET 440 to generate the TRAPPING MAP 320.

The trapping user interface 450 provides for graphical display and modification of currently specified information in the TRAPPING CONTROL DATA SET 440. The interface permits display of the source image 120 with and without a CANDIDATE TRAPPING MAP 444 superimposed upon it, and allows for runtime specification (by means of keyboard entry or mouse-based "tool" operations) of parameters defining any or all of the following:

1. The degree of automatic trap decisions to be used in production processing, ranging from fully automatic (no human intervention) to fully manual (each border between regions of different fill color to be user-specified as to trapping options);
2. Rules to be used for automatic trap decisions based upon individual color combinations, luminescence of individual colors in comparison to others, or other criteria;
3. Parameters used for determining trap characteristics, either for control of automatic operation, or manual trap specification;
4. Identification of a set of rules and/or parameters with a user-given name to be saved as a data set within the trapping system for later recall and application by reference to the user-given name;
5. Selection of any boundary between color regions of the image and interactive edit of that boundary by direct tool manipulation to expand one color region into that of another, and specifying stroke, offset, and fill characteristics directly to achieve a candidate trap for the selected boundary; and,
6. Selection of any boundary between color regions of the image and display for that boundary of all effects of misregistration of the printing plates used to print the image, both with and without application of a given candidate trap to the selected boundary.

The user interface 450 permits as one optional mode the iterative modification and display of the trapped result without committment to a final version until the results are satisfactory to the user 122, at which time the resulting TRAPPING MAP 320 is combined with the source image file 120 using a merge procedure 460 dependent upon the external format used for the source image file 120 and the resulting trapped image file 126. Supplementary information to support the merging of the source image file 120 and the TRAPPING MAP 320 is provided by an image assembly data set 470. In the preferred embodiment of the invention, the external format is PostScript level 2. The image merge procedure 460 accordingly converts the TRAPPING MAP object definition into the appropriate sequence of PostScript procedure calls and inserts this sequence of PostScript statements into those of the source image file 120 such that the TRAPPING MAP is the last object to be imaged.

Figure 5:
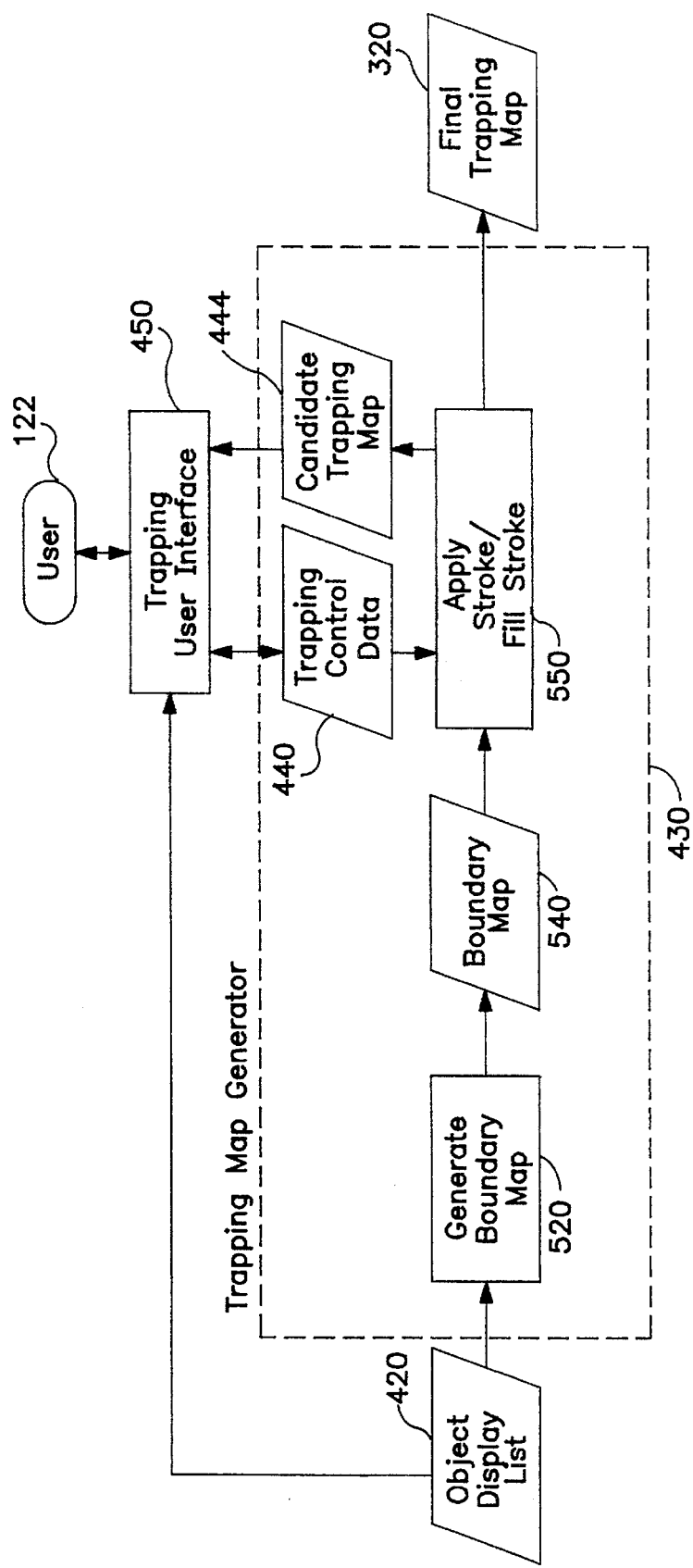
FIG. 5 is a block diagram showing the processing steps making up the TRAPPING MAP generator processing step of the trapping module of FIG. 4.

FIG. 5 is an explosion of the TRAPPING MAP generator 430 of FIG. 4, showing the processing steps by which the object DISPLAY LIST 420 is used to obtain the final TRAPPING MAP 320 under control of the trapping user interface 450. The first step in this process is to generate the polygon map of all graphic objects of the object DISPLAY LIST 420. The boundaries which delineate (polygon) regions of different fill colors are processed 530 to become the BOUNDARY MAP 540. This boundary map is used in either an automatic or an interactive (iterative) process in which the trapping control data 440 are applied to each of the line segments making up the BOUNDARY MAP 540 to determine the line width, offset and fill characteristics. In the automatic mode, a one-time application of the trapping control data 440 to the BOUNDARY MAP 540 produces the final TRAPPING MAP 320. In the interactive (iterative) mode, the result of this application is the CANDIDATE TRAPPING MAP 444 which is displayed on the user interface 450 and subject to user modification by interactive modification of the trapping control data 440 and repeating the generation of the CANDIDATE TRAPPING MAP 444. The iterative loop can be repeated until satisfactory results are obtained, and the final TRAPPING MAP 320 is generated instead of the CANDIDATE TRAPPING MAP 444.

GENERATION OF THE BOUNDARY MAP

Figure 6:
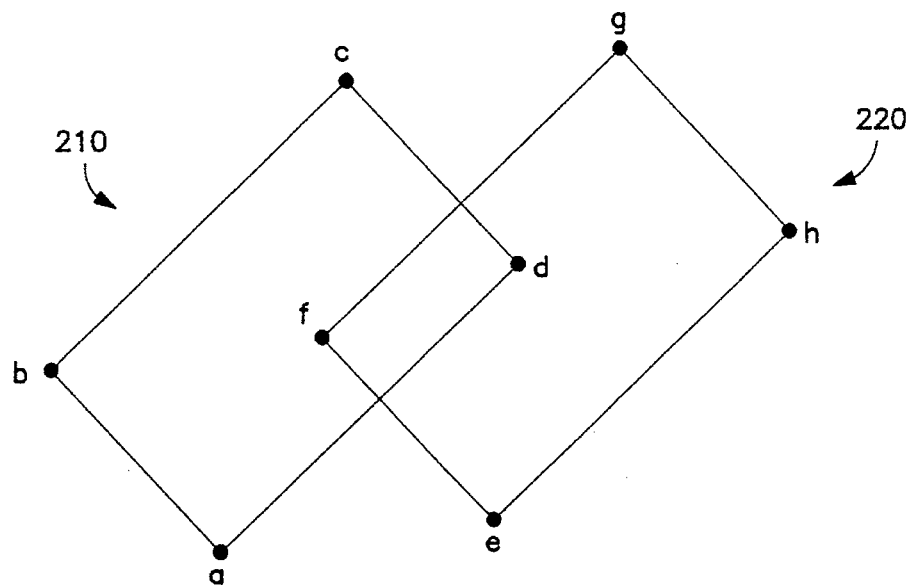
FIG. 6 shows the polygon map of the graphic objects making up the image of FIG. 2A and 2B.

In FIG. 6, the polygon map of the graphic image of FIG. 2 is shown. The two polygons of the image have GRAPHIC OBJECT DESCRIPTIONS in the DISPLAY LIST based upon four vertices each, designated as a, b, c, and d for the "red" polygon 210 of FIG. 2, and e, f, g and h for the "blue" polygon 220 of FIG. 2. Since the "blue" polygon 220 is imaged first, it appears first in the DISPLAY LIST.

The logical content of the object DISPLAY LIST 420 is given in TABLE 1:

TABLE 1

| ORIGINAL OBJECT DISPLAY LIST | | | | |
|---|---|---|---|---|
| Object | Vertex | line | Winding Number | Object char. |
| 1 | e | e–f | +1 | "Blue" fill |
|  | f | f–g | +1 |  |
|  | g | g–h | –1 |  |
|  | h | h–e | –1 |  |
| 2 | a | a–b | +1 | "Red" fill |
|  | b | b–c | +1 |  |
|  | c | c–d | –1 |  |
|  | d | d–a | –1 |  |

The DISPLAY LIST data of TABLE 1 provides information for the set of polygons, each of which is identified by a POLYGON NUMBER representing the order imaged, along with its interior fill color. The description contains a list of vertices, and characteristics of the line connecting each vertex to its successor in the list. For each vertex, the X,Y coordinates defining the point are given (herein "X" is taken to be the horizontal coordinate and "Y" the vertical coordinate), as are the starting and ending coordinates of each line defined. The WINDING NUMBER of a line segment is used for indication of the line direction as it encloses the filled region of a polygon. A line segment has a WINDING NUMBER value of +1 if the line extends from a lower Y-coordinate to a higher Y coordinate, and −1 if the line extends from a higher Y coordinate to a lower Y coordinate. For horizontal lines, which receive special treatment in the method, the WINDING NUMBER is +1 if the line extends from a lower X coordinate to a higher X coordinate, and −1 otherwise.

The generation of the BOUNDARY MAP involves clipping the polygons of the DISPLAY LIST according to the stacking order, and associating each boundary between regions of different color remaining after the clipping operation with the objects between which it forms a boundary. There are many methods for clipping polygons known in the art. The preferred embodiment makes use of an improved procedure hereinafter referred to as the DERMER TRAP METHOD, based upon a method described by Bala R. Vatti in "A Generic solution to Polygon Clipping", Communications of the ACM, July 1992, Vol. 35, No. 7, chosen for computation efficiency. In the DERMER TRAP METHOD, the Vatti method has been extended to be able to handle an arbitrary number of polygons, and tag information has been added for the BOUNDARY MAP application, as will be seen in the following discussion.

Figure 7A:
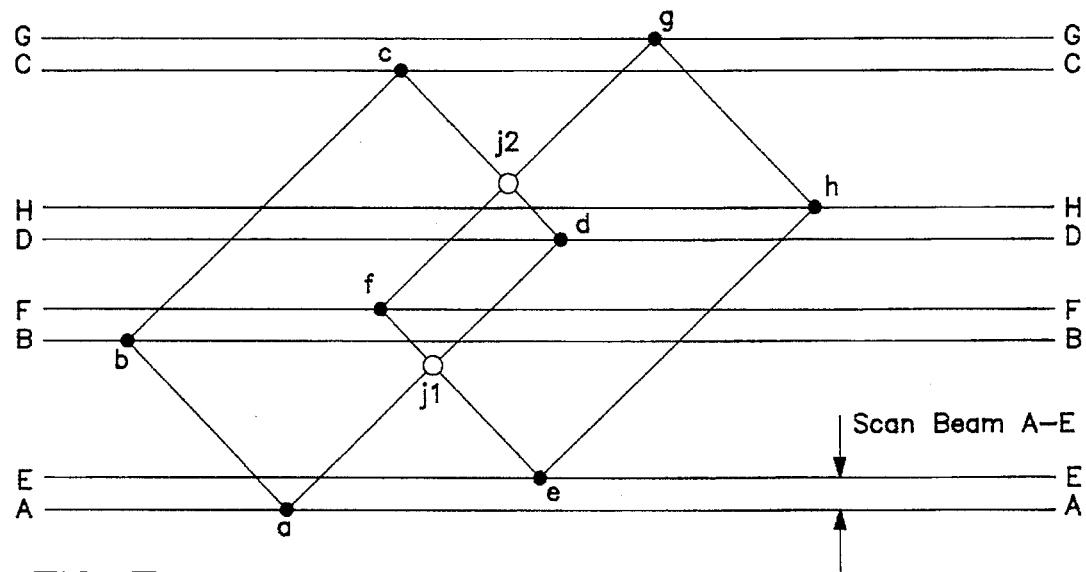
FIG. 7A and 7B illustrate the data structures used to generate the BOUNDARY MAP for the image of FIG. 2A and 2B.

FIG. 7 shows the two primary data structures utilized in the DERMER TRAP METHOD. The first is a SCAN BEAM TABLE shown in FIG. 7A. A SCAN BEAM is defined as the area between two successive horizontal lines from a set of horizontal lines drawn through all the vertices. In FIG. 7A, lines A through H represent horizontal lines drawn through vertices a through h respectively. The first SCAN BEAM in the set is therefore A-E, representing the area between the two horizontal lines A and E drawn through vertices a and e. The SCAN BEAM TABLE is obtained by sorting the Y-values of all vertices used in the ORIGINAL IMAGE and contained in the DISPLAY LIST.

Figure 7B:
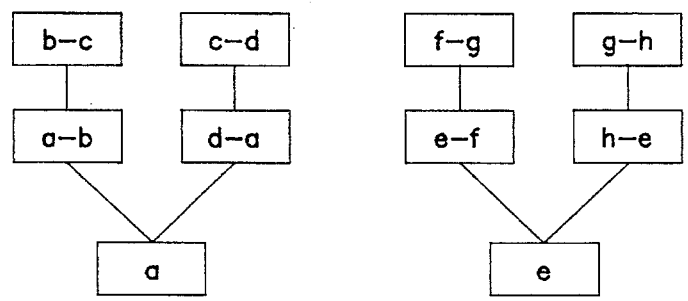

The second data structure utilized in the DERMER TRAP METHOD is a LOCAL MINIMUM TABLE shown in FIG. 7B. Each polygon of the OBJECT DISPLAY LIST is processed in sequence and added to the LOCAL MINIMUM TABLE as a linked list of polygon line segments sorted in ascending order of vertical coordinate. All edges originating or terminating at each local minimum vertex are organized as a succession from bottom to top, with each edge linked to a successor edge until a local maximum is reached. In FIG. 7B two local minima corresponding to vertices a and e form initial nodes for links as shown. The first line segment a-b originates at vertex a. Line segment b-c originates at vertex b and terminates at the local maximum at vertex c. Accordingly, segment b-c is the SUCCESSOR EDGE of segment a-b, and segment b-c has no SUCCESSOR EDGE since it terminates at a local maximum. Each entry in the LOCAL MINIMUM TABLE consists of all the available information for the indicated line segment, including coordinates, WINDING NUMBER, polygon reference number, and pointers to previous and successors in the table.

FIGS. 8 through 11 illustrate the processing steps carried out for the the DERMER TRAP METHOD. Starting from the bottom and moving to the top, the method processes the polygon edges one SCAN BEAM at a time, maintaining at all times an ACTIVE EDGE TABLE of edges which are active within the SCAN BEAM being processed. At the bottom of each SCAN BEAM new local minima are added to the ACTIVE EDGE TABLE. Inside each SCAN BEAM intersections between edges are processed. At the top of each SCAN BEAM terminating edges are either deleted, or replaced by their SUCCESSOR EDGES (if any) in the LOCAL MINIMUM TABLE.

Figure 8:
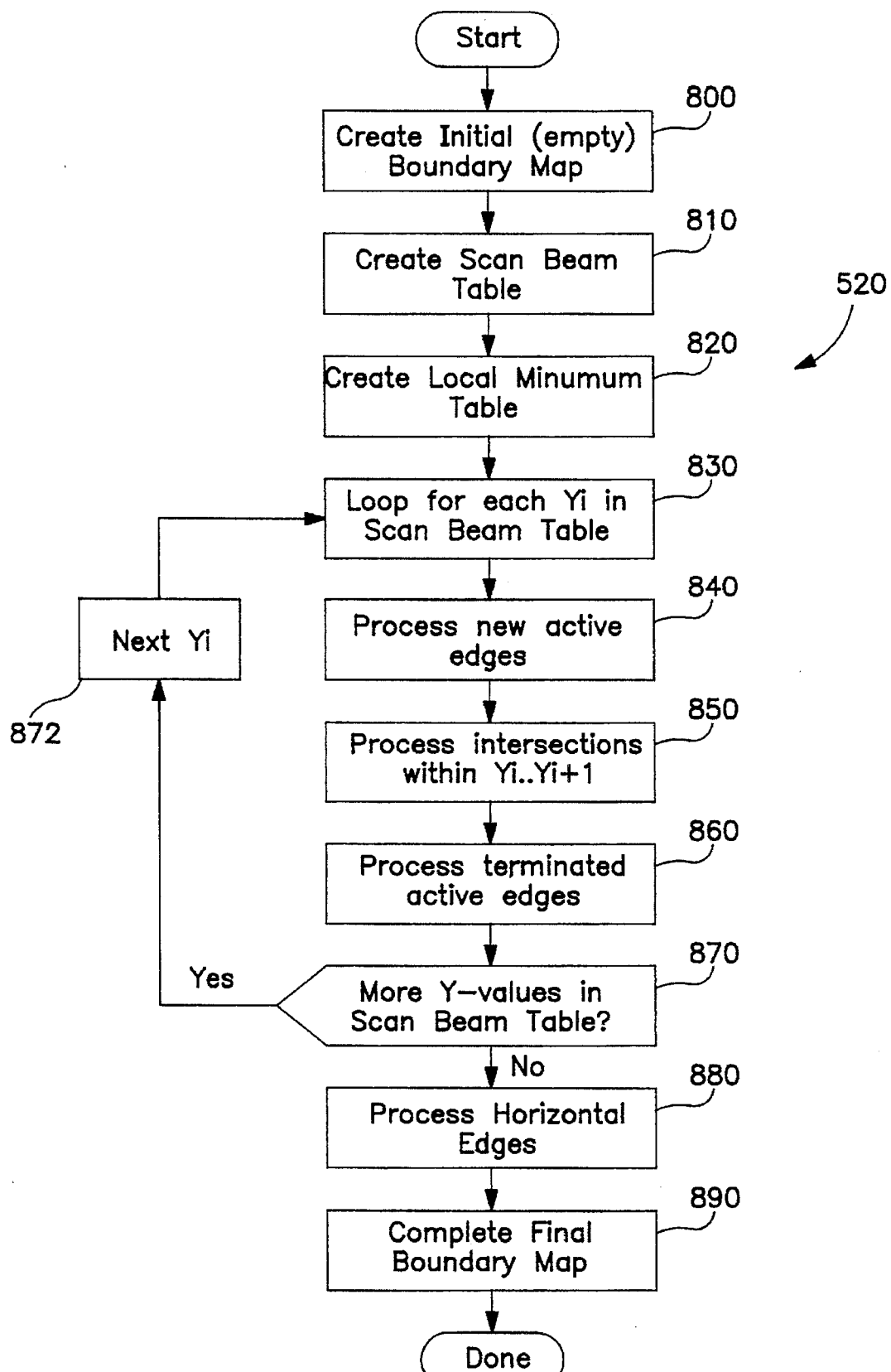
FIG. 8 shows the main flow chart of the data procesing steps by which the data of FIG. 7A and 7B is used to generate the BOUNDARY MAP for the image of FIG. 2A and 2B.

The overall processing flow for the method 520 is shown in FIG. 8. The first step is the creation of an empty BOUNDARY MAP 800, followed by creation of the SCAN BEAM TABLE 810 by sorting all Y-coordinates of line segments as described above, followed by the creation of the LOCAL MINIMUM TABLE 820. The main processing loop 830 takes place beginning with the bottom SCAN BEAM and working to the top. For the SCAN BEAM i extending from $Y_i$ to $Y_{i+1}$, line segments corresponding to new local minima are added to the ACTIVE EDGE TABLE 840, intersections occuring within the SCAN BEAM are processed 850, and edges which terminate at the top of the SCAN BEAM 860 are processed. As a new line segment is added to the ACTIVE EDGE TABLE, a boundary is opened if it forms a border between different polygons, as determined below. After this processing, test 870 checks to see if there are additional SCAN BEAMS to be processed. If so, the previous $Y_{i+1}$ value becomes the new value of $Y_i$ (box 872), and the loop 830 is repeated for the next SCAN BEAM. Otherwise, exit is taken from the procedure, horizontal edges (if any) are processed 880 as described below, and the set of boundaries formatted 890 to complete the BOUNDARY MAP.

Figure 9:
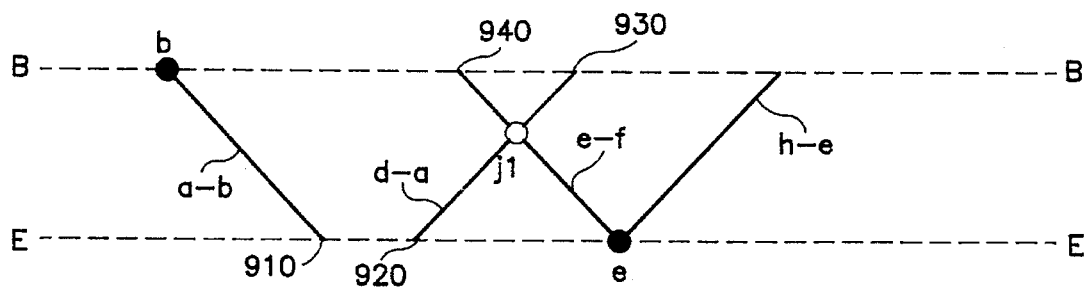
FIG. 9 shows the geometry for data processing within a single SCAN BEAM.

FIG. 9 shows the geometry for processing data for a single SCAN BEAM, shown with data corresponding to SCAN BEAM E-B for example. Except in the special case of horizontal lines (to be discussed further below), all active edges within a given SCAN BEAM extend from the bottom line to the top line defining the SCAN BEAM, and are sorted in order of increasing value of the X-coordinate at the bottom line of the SCAN BEAM. In the example, the first active edge is a-b, extending from the intersection 910 of the line segment a-b with the line E defining the bottom of the SCAN BEAM. The second active edge d-a extends in similar fashion from its intersection 920 with line E and instersection 930 with line F. The third and fourth active edges e-f and h-e originate at the vertex e, and are therefore newly added to the ACTIVE EDGE TABLE as of this SCAN BEAM. Edge a-b termintates at the upper line B defining the SCAN BEAM. Finally, an intersection j1 occurs between edges d-a and e-f, detected by the fact that the X-value 940 of edge e-f is less than the corresponding value 930 of edge d-a.

Associated with each edge of the ACTIVE EDGE TABLE is a POLYGON STACK which shows in order the polygons imaged to the left of the edge, and the cumulative WINDING NUMBER for the edges (traversed left to right in the ACTIVE EDGE TABLE) up to the edge. Only the highest-numbered polygon is unclipped and imaged in the ORIGINAL IMAGE on the left side of that edge. The POLYGON STACK is a sequence {POLYGON NUMBER: WINDING NUMBER, . . . }. Similarly, two consecutive edges in the ACTIVE EDGE TABLE having a higher-numbered polygon on the POLYGON STACK indicate that the line corresponding to the first such edge is "hidden" since a covering fill color exists on both sides. In the SCAN BEAM E-B shown in FIG. 9, for example, the initial entries for the ACTIVE EDGE TABLE and POLYGON STACK (at the bottom of the SCAN BEAM) are as follows:

| ACTIVE EDGE TABLE: { | a-b | d-a | e-f | h-e | } |
|---|---|---|---|---|---|
| POLYGON STACK: | {none} | {2:1} | {none} | {1:1} | |

Thus, line a-b has only background to its left, line d-a borders polygon 2 (the "red polygon") to its left with a cumulative winding number of 1, line e-f has only background to its left, and line h-e borders polygon 1 (the "blue polygon") to its left. Accordingly, boundaries are open for line a-b ("white" to "red"), d-a ("red" to "white"), e-f ("white" to "blue") and h-e ("blue" to "white").

The active edges in the ACTIVE EDGE TABLE are maintained in order of increasing X-value at the lower line $Y_i$ defining the SCAN BEAM. Edges where X-values at $Y_i$ are the same are ordered by X-value at $Y_{i+1}$. Any processing step which causes active edges to be added or removed from the ACTIVE EDGE TABLE causes the POLYGON STACKS of any intervening edges to be updated such that they always provide the above information.

Figure 10:
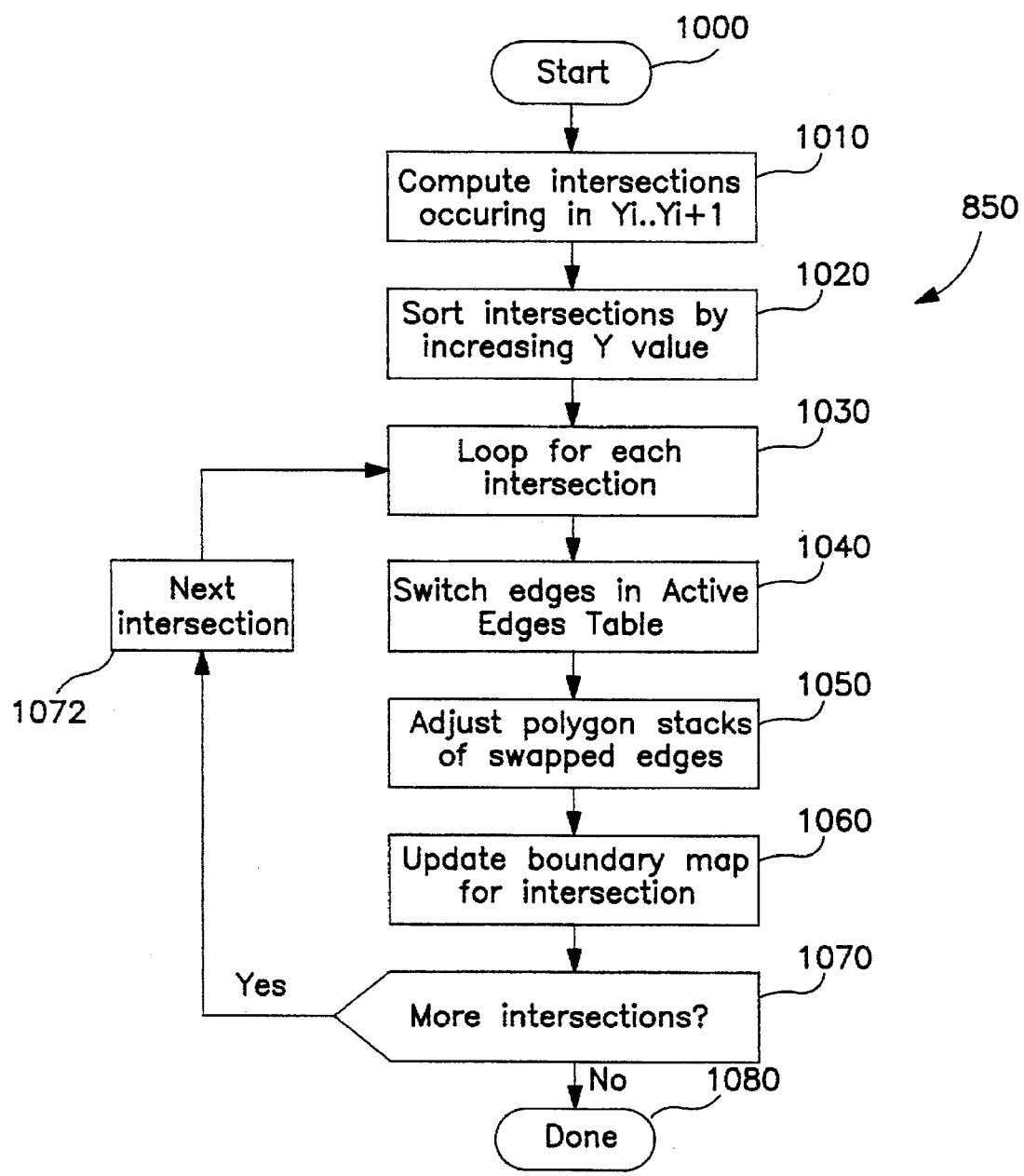
FIG. 10 shows the processing flowchart for processing intersections.

FIG. 10 shows the flow chart for the step 850 of FIG. 8 for processing intersections which occur within a given SCAN BEAM extending between Y-values $Y_i$ and $Y_{i+1}$. The first step is to identify intersections 1010 by comparing the X-values at the upper line $Y_{i+1}$ defining the SCAN BEAM as described above for FIG. 9. Since the active edges in the ACTIVE EDGE TABLE are maintained in order of increasing X-value at the lower line $Y_i$ defining the SCAN BEAM, the upper edges are similarly ordered unless an intersection has occurred. The list of intersections found in step 1010 is sorted 1020 by increasing Y-value, and a loop performed 1030 in which each intersection is processed. The entries for the intersecting edges are switched 1040 in the ACTIVE EDGE TABLE, reflecting the new left-right ordering of edges above the intersection point within the SCAN BEAM. Finally, the POLYGON STACK information is updated 1050 according to the data associated with the edges above the intersection. Accordingly, in the example of FIG. 9, the final entries for the ACTIVE EDGE TABLE and POLYGON STACK (at the top of the SCAN BEAM) are as follows:

| ACTIVE EDGE TABLE: { | a-b | e-f | d-a | h-e } |
|---|---|---|---|---|
| POLYGON STACK: | {none} | {2:1} | {2:1,1:1} | {1:1} |

Thus, line a-b still has only background to its left, line e-f borders polygon 2 to its left with a cumulative winding number of 1, line d-a borders polygon 2 with a cumulative winding number of 1 and at the same time borders polygon 1 with a cumulative winding number of 1, and line h-e borders polygon 1 (the "blue polygon") to its left. Since line e-f (of polygon 1) has a higher numbered polygon on each side (polygon 2), it is recognized as a hidden line. The BOUNDARY MAP is updated 1060 so as to close open boundaries which reach an intersection point, and start new boundaries for non-hidden lines. Accordingly, line a-b remains an open boundary ("white" to "red"), d-a become an open boundary ("red" to "blue") starting at j1 and a-j1 ("red" to "white") is added to the BOUNDARY MAP, e-f becomes a hidden boundary and e-j1 ("white" to "blue") is added to the BOUNDARY MAP and h-e remains open ("blue" to "white"). After this processing, a test is made 1170 for more intersections. If so, the next intersection 1072 is selected and the loop 1030 repeated. If not, exit 1080 is taken from the loop.

Figure 11:
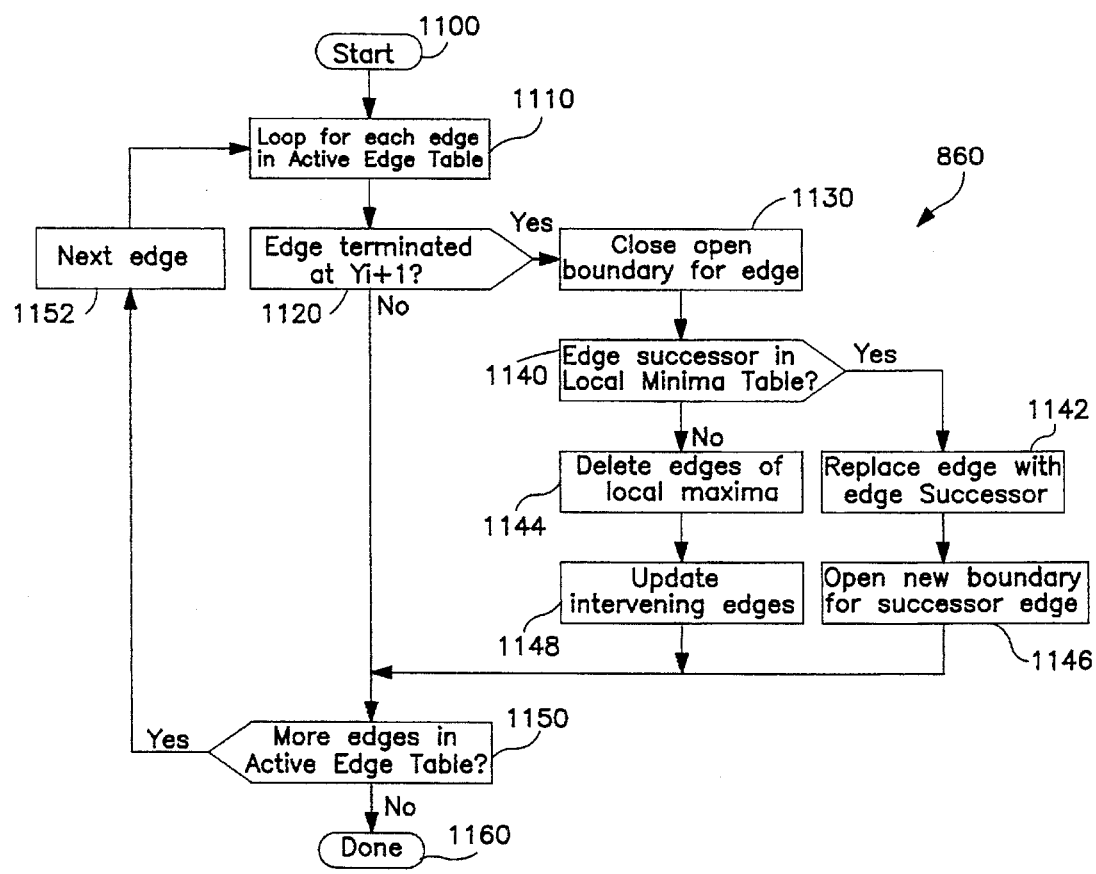
FIG. 11 shows the processing flowchart for processing terminated edges in the active edge table.

FIG. 11 shows the flow chart for the step 860 of FIG. 8 for processing edge terminations at the top of the current scan been extending between Y-values $Y_i$ and $Y_{i+1}$. A loop 1110 is carried out over all active edges in the ACTIVE EDGE TABLE. For each edge, test 1120 examines whether or not the edge terminates at the top line $Y_{i+1}$ defining the SCAN BEAM. If not, the edge is bypassed and the next one processed 1150. If so, any open boundary for the edge is closed 1130 and the boundary added to the BOUNDARY MAP. A check 1140 is made to see if the edge has a successor in the LOCAL MINIMUM TABLE. If so, the edge is replaced 1142 with its EDGE SUCCESSOR and if the edge is visible a new boundary is opened 1146 for the successor edge. Otherwise, the edge is one side of a local maximum. The other edge of the local maximum is found and both edges are deleted 1144 from the ACTIVE EDGE TABLE. Any intervening edges in the ACTIVE EDGE TABLE have their POLYGON STACKS updated with the removal of that polygon and boundaries are opened and closed 1148 as appropriate. In the example of FIG. 9 shown for SCAN BEAM E-B, the edge a-b terminates, thereby closing the boundary for that edge. The successor edge b-c replaces it in the ACTIVE EDGE TABLE, and a new boundary is opened accordingly for it.

Them are three procedures available for dealing with horizontal lines of the STRUCTURED GRAPHIC IMAGE:

1. The procedure of the preferred embodiment involves construction of a perpendicular set of SCAN BEAMS using the X-coordinates instead of the Y-coordinates. In this manner, horizontal lines become the equivalent of vertical lines for the Y-coordinate SCAN BEAM TABLE. The processing follows the steps described above, with the exception that those boundaries already computed need not be repeated;

2. As an alternative to the above, the coordinates in all GRAPHIC OBJECT DESCRIPTIONS included in the DISPLAY LIST may be rotated by any non-zero angle after the first pass through the loop 830, and the loop repeated as described above, with the exception that those boundaries already computed need not be repeated; and, 3. As a second alternative to the above, the coordinates in all GRAPHIC OBJECT DESCRIPTIONS in the DISPLAY LIST may be rotated after generating the DISPLAY LIST 420 and before the BOUNDARY MAP generation step 520, where the rotation angle is chosen such that there remain no horizontal lines in the coordinate system resulting from the rotation.

A summary of the processing steps using the data of TABLE 1 is given in TABLE 2, in which the active edges, intersections processed and boundaries identified are listed for each SCAN BEAM in the order processed.

For the intersections j1 and j2, the new boundaries created are shown, for example as d-j1, j1-a, e-j1 and j1-f. Boundary information is noted as "left boundary/right boundary", with "left" corresponding to the direction of decreasing X-value, and "right" to that of increasing X-value, and with the object numbers given appropriately. In the example given, "white" represents the background, "blue" the blue object, and "red" the red object. Any "boundary" for which, as a result of the polygon stacking order and WINDING NUMBER information, the left and right object numbers are the same is "hidden", e.g., in the case of segment j1-f in SCAN BEAM E-B, or e-f in SCAN BEAM B-F.

TABLE 2

POLYGON CLIPPING PROCEDURE SUMMARY

| Scan Beam | Active Edges | Intersections | Boundaries Processed | Terminating Edges |
|---|---|---|---|---|
| A-E | a-b | none | white/red | none |
|  | d-a |  | red/white |  |
| E-B | a-b |  | white/red | a-b -> b-c |
|  | d-a | d-j1, j1-a | red/blue, red/white |  |
|  | e-f | e-j1, j1-f | white/blue, (red/red) |  |

TABLE 2-continued

POLYGON CLIPPING PROCEDURE SUMMARY

| Scan Beam | Active Edges | Intersections | Boundaries Processed | Terminating Edges |
|---|---|---|---|---|
| | h–e | | blue/white | |
| B–F | b–c | none | white/red | e–f –> f–g |
| | d–a | | red/white | |
| | e–f | | (red/red) | |
| | h–e | | blue/white | |
| F–D | b–c | none | white/red | d–a –> c–d |
| | d–a | | red/white | |
| | f–g | | (red/red) | |
| | h–e | | blue/white | |
| D–H | b–c | none | white/red | h–e –> g–h |
| | c–d | | red/white | |
| | f–g | | (red/red) | |
| | h–e | | blue/white | |
| H–C | b–c | | white/red | b–c, c–d |
| | c–d | c-j2, j2-d | red/white, red/blue | |
| | f–g | f-j2, j2-g | (red/red), white/blue | |
| | g–h | | blue/white | |
| C–G | f–g | | white/blue | f–g, h–g |
| | g–h | | blue/white | |

Figure 12:
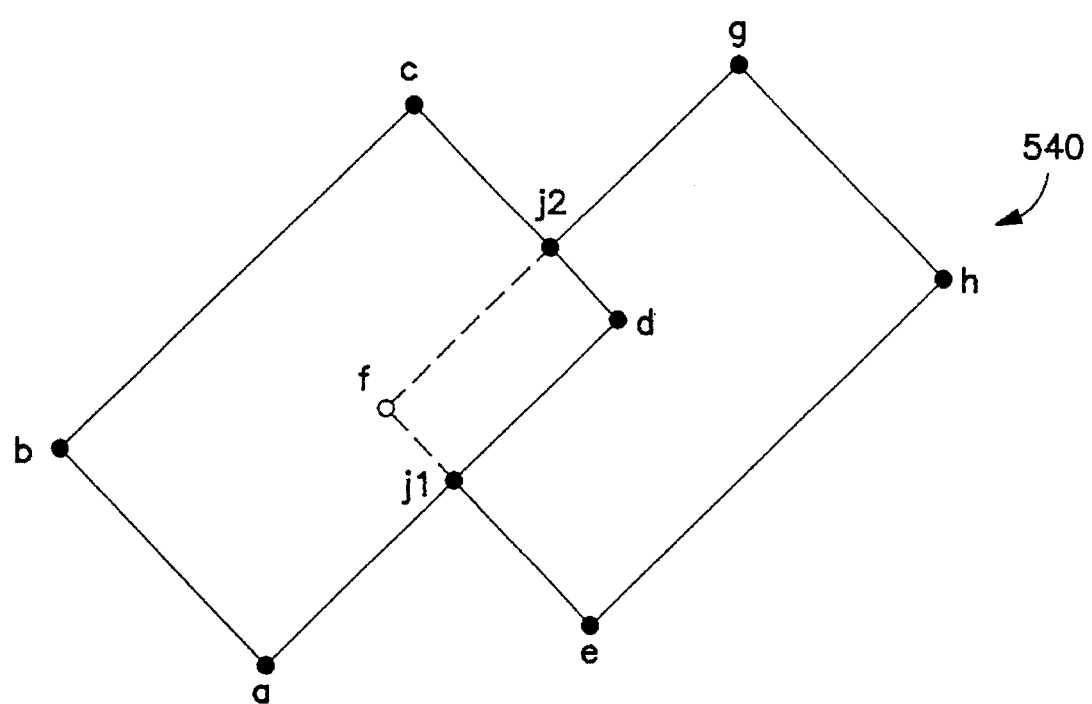
FIG. 12 shows the BOUNDARY MAP resulting from application of the DERMER TRAP METHOD.

The result of the above operations is a new DISPLAY LIST for the BOUNDARY MAP 540 shown in FIG. 12. The display list describes all surface boundaries between colored areas of the ORIGINAL IMAGE. It has the following characteristics: no duplicate line segments exist, no line segments between regions of the same fill color are retained, and each line segment is tagged with identifiers for the two regions for which it forms a boundary, providing access to the fill colors and other object attributes required for specification of traps.

The logical content of the BOUNDARY MAP obtained from the data of TABLE 1 using the polygon clipping process described above is given in TABLE 3.

TABLE 3

FINAL BOUNDARY MAP

| line | left Object | lift Fill color | right Object | right Fill color |
|---|---|---|---|---|
| a-j1 | 2 | Red | 0 | White |
| e-j1 | 0 | White | 1 | Blue |
| a-b | 0 | White | 2 | Red |
| j1-d | 2 | Red | 1 | Blue |
| e-h | 1 | Blue | 0 | White |
| d-j2 | 2 | Red | 1 | Blue |
| b-c | 0 | White | 2 | Red |
| j2-c | 2 | Red | 0 | White |
| j2-g | 0 | White | 1 | Blue |
| h-g | 1 | Blue | 0 | White |

The list contains the segments in the order generated by the DERMER TRAP METHOD, with the left and right tag information. For each boundary, the left and right object identification numbers are shown, with "0" the "white" background, "1" the "blue" object, and "2" the "red" object. Any segment for which either the "left object" or "right object" is shown as "0" borders only the single object with the non-zero identifier, and having the fill color shown. Any segment for which both objects are non-zero corresponds to a border with the "left fill color" on one side and the "right fill color" on the other. The resulting BOUNDARY MAP in the example contains 11 line segments, two of which border regions of different color other than the "white" background.

PROCESSING TIME FOR BOUNDARY MAP GENERATION

Figure 13:
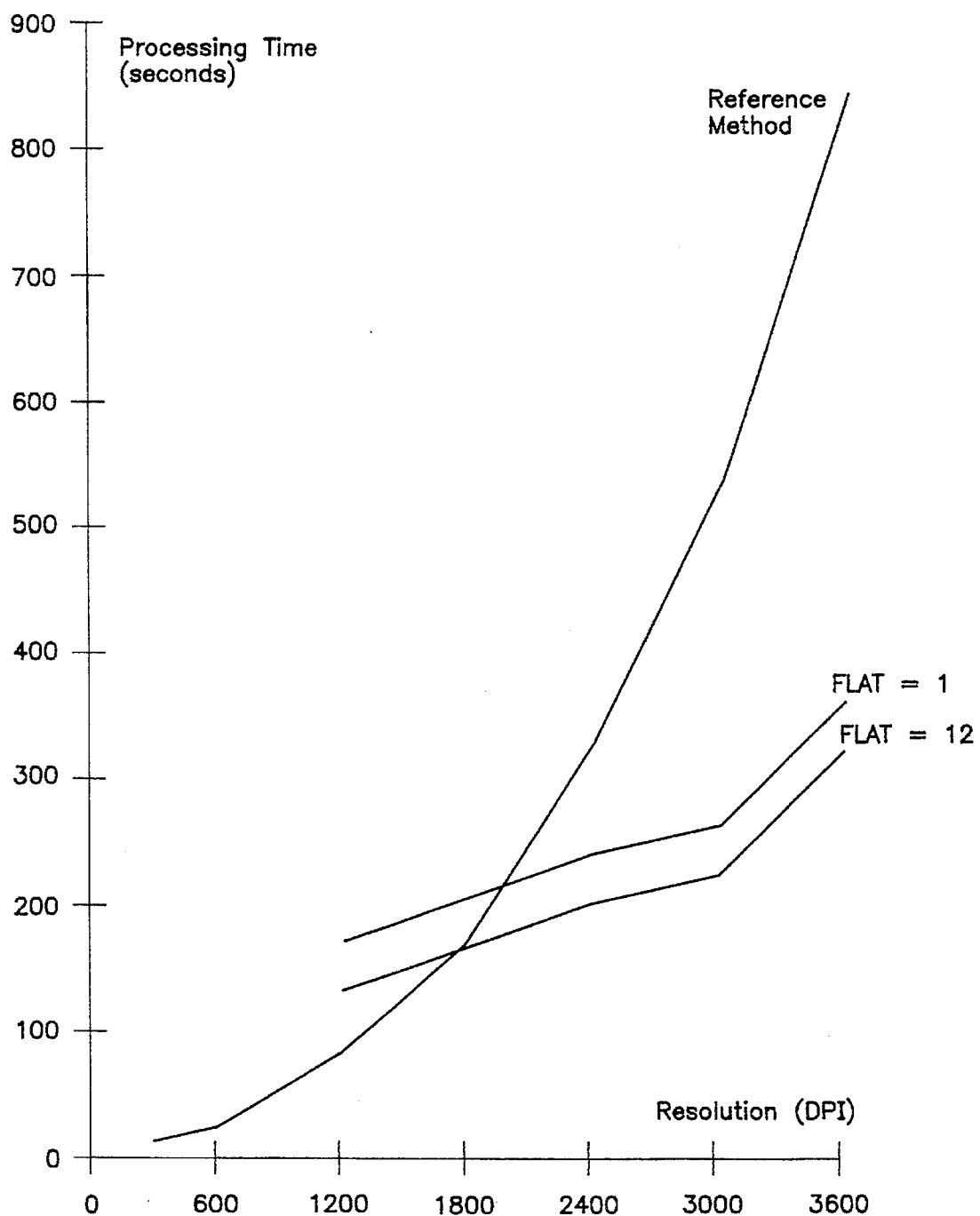
FIG. 13 is a graph comparing the processing time of the DERMER TRAP METHOD with that of a raster method for CANDIDATE TRAPPING MAP generation.

FIG. 13 shows the results of a timing test performed with the DERMER TRAP METHOD. The graph shows the time required to generate a CANDIDATE TRAPPING MAP from an ORIGINAL IMAGE made up of 405 graphic objects, as a function of the output device resolution given in dots per inch (d.p.i.). For comparison, the results using the commercially available Aldus "TrapWise" product (Reference Method) are shown for the same ORIGINAL IMAGE. The data obtained for these tests is summarized in TABLE 4.

TABLE 4

PROCESSING TIME TEST RESULTS

| Resolution d.p.i. | Reference Method | Dermer Trap Method FLAT = 1 | Dermer Trap Method FLAT = 12 |
|---|---|---|---|
| 300 | 14 sec | | |
| 600 | 29 | | |
| 1,200 | 87 | 171 sec | 132 sec |
| 1,800 | 180 | 209 | 170 |
| 2,400 | 339 | 251 | 209 |
| 3,000 | 551 | 272 | 230 |
| 3,600 | 863 | 379 | 324 |

It is noted from the test results that the processing time required for generation of the BOUNDARY MAP using the DERMER TRAP METHOD is essentially linear in the total number of line segments making up all the objects of the ORIGINAL IMAGE (the non-linear increase shown in the test results between resolution 3000 and 3600 is due to increasing memory requirements with resulting paging operation by the operating system) Although there can be a large number of such line segments for a complex image curves and many object intersections, the number is generally much less than the number of pixels to be considered using a raster scan method for trap boundary identification. To compensate for this effect, a flatness parameter ("FLAT") is introduced to fix the maximum error (in output resolution elements) of line segments generated from continuous curves. The test result data of TABLE 4 and FIG. 13 are shown for two values of this parameter: the worst case (FLAT=1) in which flattening errors of maximum 1 resolution element are allowed, and the FLAT=12 case in which curves are reduced to straight line segment with a maximum error of 12 output resolution elements. The availablitity of the FLAT parameter in the user interface 450 permits choice of a value which trades off computation time with visual accuracy of the image.

BOUNDARY MAP TRAPPING OPERATIONS

Figure 14A:
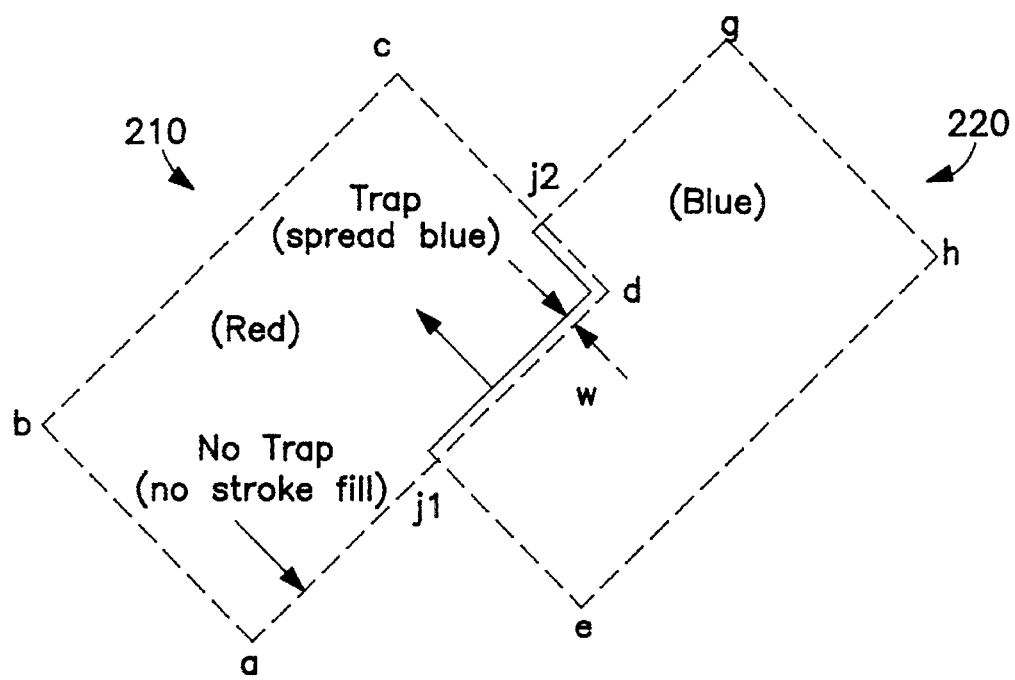
FIG. 14A and 14B show the effect of spreading one or the other of the colors represented in the image of FIG. 2A and 2B by assignment of stroke characteristics to the BOUNDARY MAP.
Figure 14B:
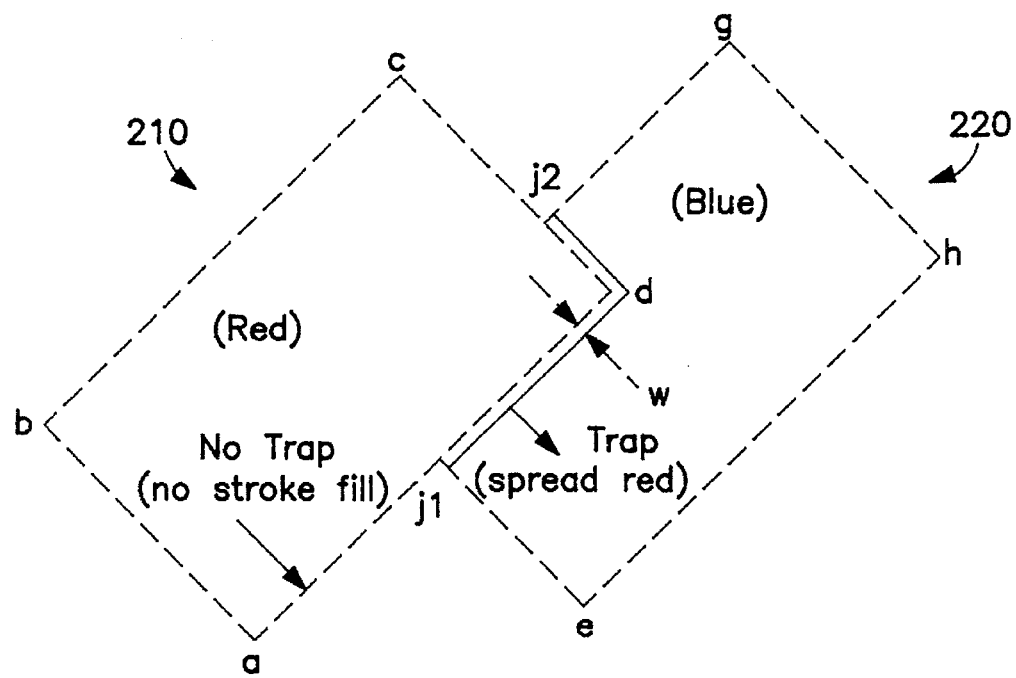

The BOUNDARY MAP of TABLE 3 is intially defined (and retained) without assignment of line characteristics for each boundary of which it is comprised. In FIG. 14A and 14B, the assignment of line characteristics according to two trapping options is shown for the simple case in which the objects of FIG. 2 are fried with spot colors. In FIG. 14A, the boundary map segments which border the "red" object 210 and the "blue" object 220 are given a stroke width and offset in the direction of the "red" object 210, and fried with the "blue" color, thereby effecting a trap which spreads the "blue" object 220 toward the "red" object 210. The TRAPPING MAP resulting from this operation is given in TABLE 5, consisting only of the two line segements for which the above characteristics are defined.

TABLE 5

TRAPPING MAP SPREADING BLUE TO RED

| line | Width, w offset (+/−) | Stroke Fill color |
|---|---|---|
| j1-d | −w | Blue |
| d-j2 | −w | Blue |

The stroke width w in TABLE 5 is a defined parameter (preset or user given), and a negative offset indicates offset to the left as viewed in FIG. 14A and 14B, as the the line segment is drawn from its starting vertex to its ending vertex. Note that in FIG. 14A and 14B the remaining line segments of the BOUNDARY MAP are shown without any trap (no stroke characteristics) for reference. In FIG. 14B, the same segments are given a stroke width and offset in the direction of the "blue" object 220 and fried with the "red" color, thereby effecting a trap which spreads the "red" object 210 toward the "blue" object 220. The TRAPPING MAP resulting from this operation is given in TABLE 6.

TABLE 6

TRAPPING MAP SPREADING RED TO BLUE

| line | Width, w offset (+/−) | Stroke Fill color |
|---|---|---|
| j1-d | +w | Red |
| d-j2 | +w | Red |

Figure 15A:
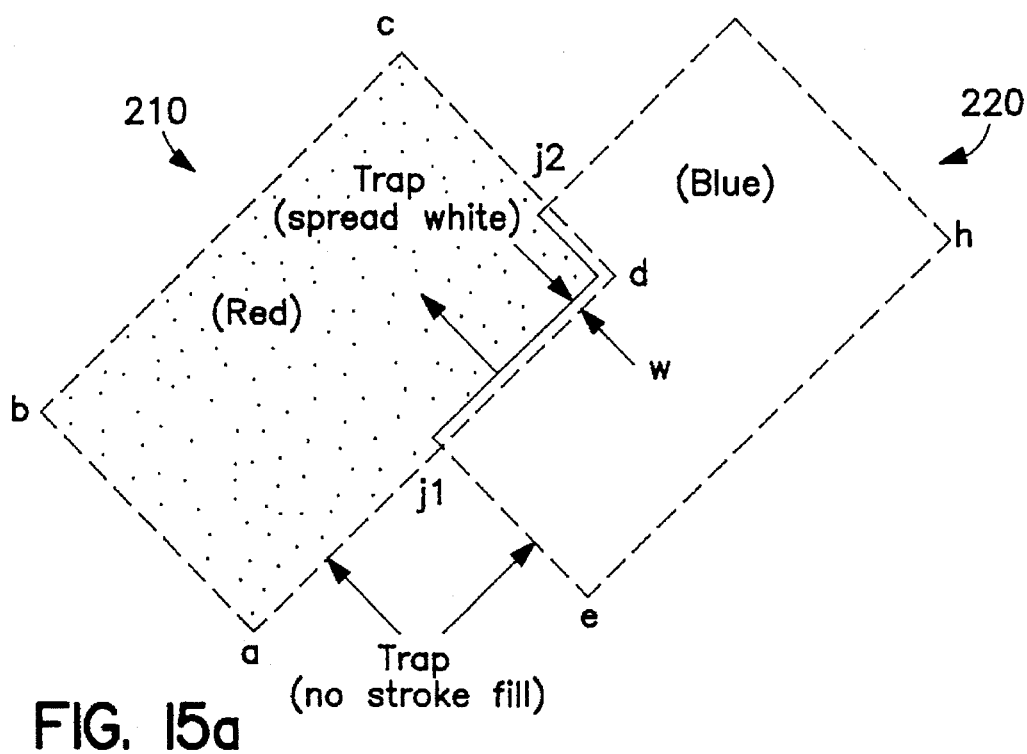
FIG. 15A and 15B show the effect of choking one or the other of the colors represented in the image of FIG. 2A and 2B by assignment of stroke characteristics to the BOUNDARY MAP.
Figure 15B:
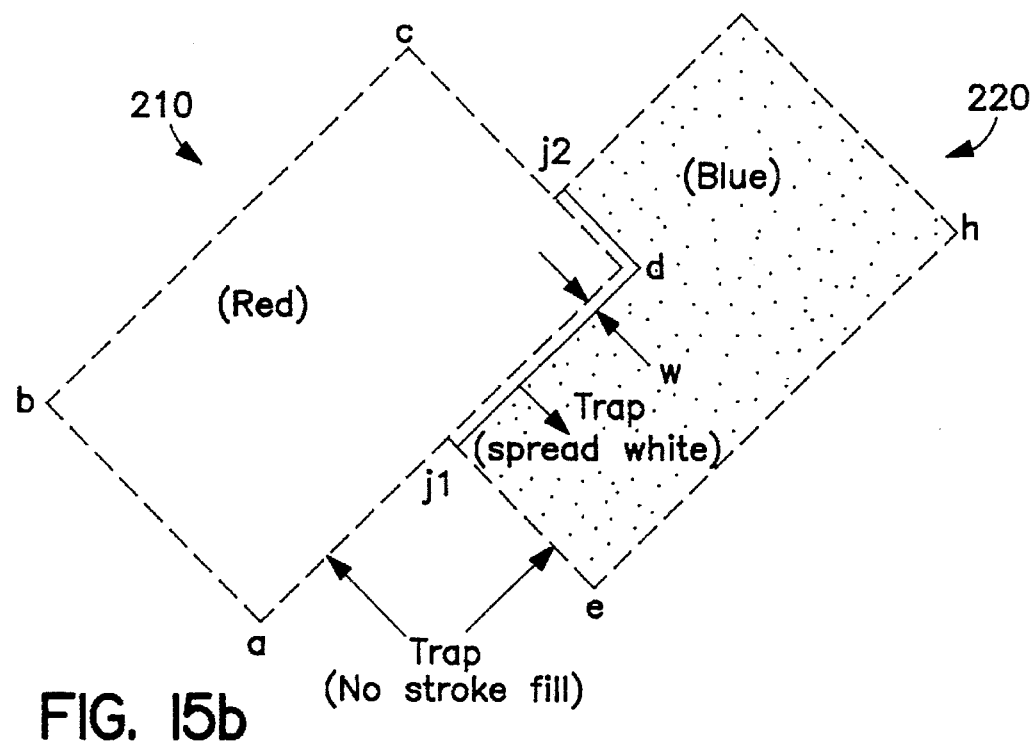

For the boundaries of the BOUNDARY MAP bordering on the regions for which a trap is to be specified, the stroke fill color can be a distinct color, or filled with "white" (the color of the "paper" on which the image is to be printed. FIG. 15A and 15B provide examples of traps in which white is spread into one or the other of the objects of the example of FIG. 2. TABLE 7 and TABLE 8 show the TRAPPING MAP resulting from these operations, for the case of FIG. 15A, in which the white is spread into the "red" object 210, and in FIG. 15B, in which white is spread into the "blue" object 220. Further examples illustrating these options are given below.

TABLE 7

TRAPPING MAP SPREADING WHITE TO RED

| line | Width, w offset (+/−) | Stroke Fill color |
|---|---|---|
| j1-d | −w | White |
| d-j2 | −w | White |

TABLE 8

TRAPPING MAP SPREADING WHITE TO BLUE

| line | Width, w offset (+/−) | Stroke Fill color |
|---|---|---|
| j1-d | +w | White |
| d-j2 | +w | White |

Figure 16A:
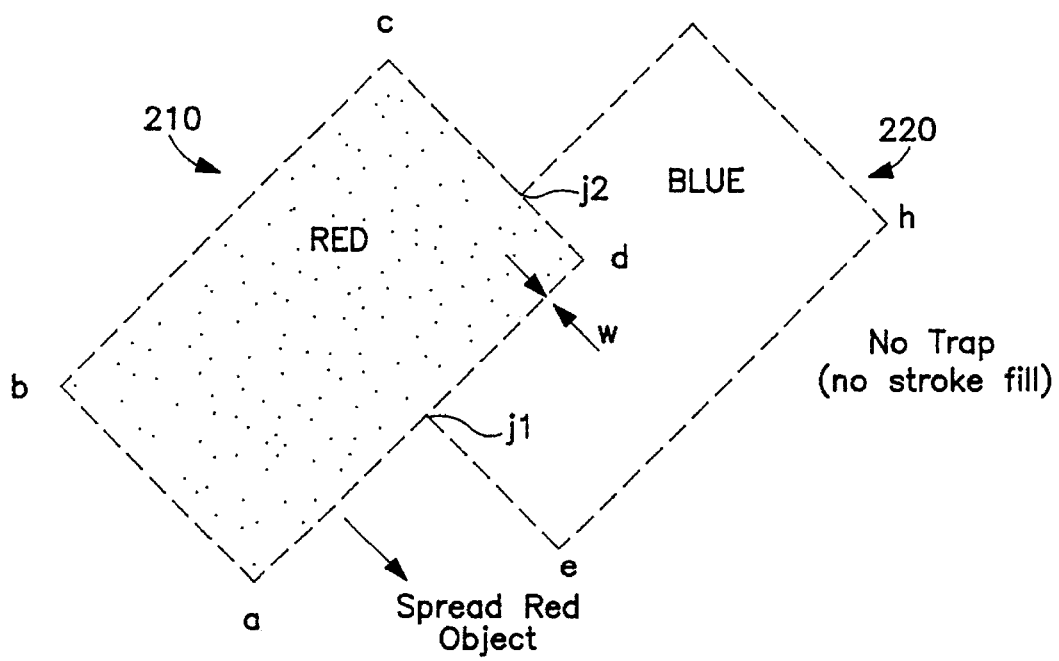
FIG. 16A and 16B show the effect of spreading or choking an entire region of color represented in the image of FIG. 2A and 2B by assignment of stroke characteristics to the BOUNDARY MAP.
Figure 16B:
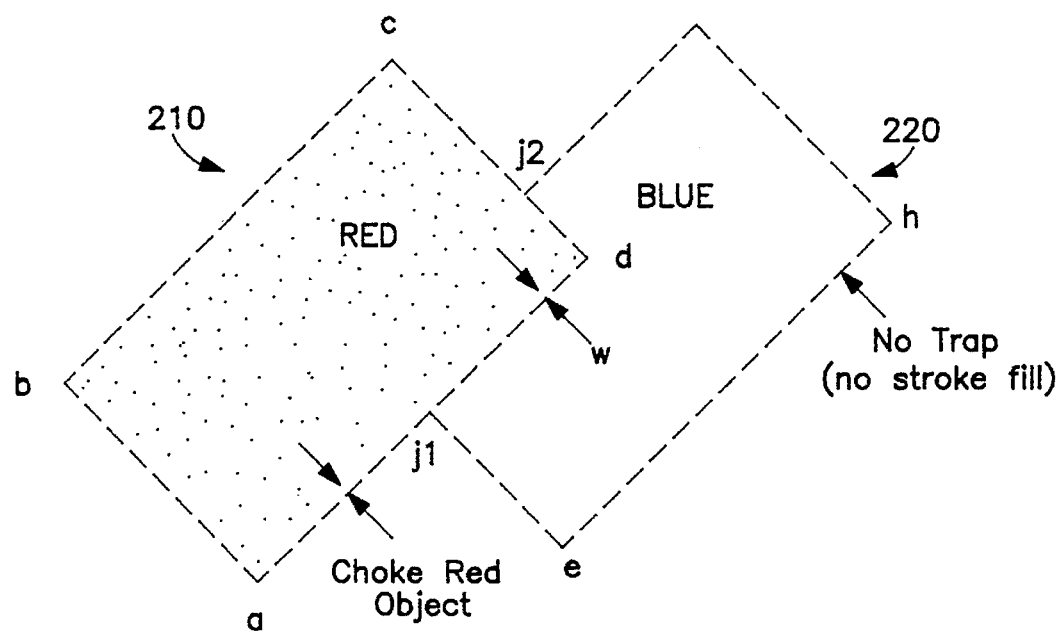

The options shown in FIG. 14A, 14B, 15A and 15B all make use of the same BOUNDARY MAP, as given in TABLE 3, which accordingly is required to be computed only once. These examples illustrate application of the trapping options only to the boundaries which border regions of different color, and therby producing the TRAPPING MAPS of TABLES 5 through 8. Another option supported by the BOUNDARY MAP of TABLE 3 is that of trapping all of the boundaries of a given object. This is possible since the object associated with each boundary segment is retained in the color fill tag for that segment. An example of this case is shown in FIG. 16A and 16B. In FIG. 16A, the entire "red" object of FIG. 2 is spread by a width w (offset so as to increase the object size). The TRAPPING MAP resulting from this operation is given in TABLE 9.

In FIG. 16B, the entire "red" object of FIG. 2 is "choked" by a width w (offset so as to reduce the object size). The TRAPPING MAP corresponding to the choking operation of FIG. 16B is similar to that shown in TABLE 9, with the exception of a negative offset, and stroke fill color of "white".

TABLE 9

TRAPPING MAP SPREADING THE "RED" OBJECT

| line | Width, w offset (+/−) | Stroke Fill color |
|---|---|---|
| j1-d | +w | Red |
| d-j2 | " | " |
| a–b | " | " |
| b–c | " | " |
| c-j2 | " | " |
| j1-a | " | " |

PROCESS COLOR TRAPPING

The examples given above assume the simple case in which the colors of the "red" object 210 and the "blue" object 220 of FIG. 2 are printed with two spot color plates, one printing the "red" ink, and the other the "blue" ink. The following discussion considers the more general case in which process colors (cyan, magenta, yellow and black) are used. It should be noted that the BOUNDARY MAP generated by the method of the invention is identical, and independent of choice of colors, number of printing plates, or similar decisions involved in the realization of the colors, previously noted as "red" and "blue".

Process colors are created by printing layers of the PROCESS PRIMARY COLORS cyan, magenta, yellow and black in different percentages, possibly in combination with spot colors, embossing or varnishes. Each layer is printed by a separate printing plate. During the printing process these plates can misregister creating different combinations of color. The present discussion is limited to printing using just the four PROCESS PRIMARY COLORS, with a single process color represented by a tuple (c,m,y,k), where each element in the tuple is a number ranging from 0 to 100 giving the percentage of that color. For example, a green made up of 100 percent cyan and 100 percent yellow is represented as (100,0,100,0). Since each point on a printing plate representing a given color is capable of printing either 0% ink or 100% ink, the values for solid (unscreened) colors must be 0 or 100. For tints and degredés which are to be rendered using halftone screens, any value on the range 0% to 100% can be used.

In general when two colors have a border any single (color separation) printing plate can shift, as can any combination of printing plates. The region surrounding the boundary between two color regions which is affected by plate misregistration is referred to as the TRAP ZONE. TABLE 10 shows for every possible plate shift all the colors that can occur in the TRAP ZONE when two process colors (c1,m1,y1,k1) and (c2,m2,y2,k2) intersect. Depending on which plates shift in which directions and by what relative amounts the shifts occur, any combination of these colors can be generated during printing.

TABLE 10

POSSIBLE COLORS IN TRAP ZONE GIVEN BY PLATE SHIFT

Trap Zone Color Components

| Cyan | Magenta | Yellow | Black | Plates shifted |
|------|---------|--------|-------|----------------|
| c1 | m1 | y1 | k1 | none or |
| c2 | m2 | y2 | k2 | all |
| c2 | m1 | y1 | k1 | cyan or |
| c1 | m2 | y2 | k2 | yellow + magenta + black |
| c1 | m2 | y1 | k1 | magenta or |
| c2 | m1 | y2 | k2 | cyan + yellow + black |
| c1 | m1 | y2 | k1 | yellow or |
| c2 | m2 | y1 | k2 | cyan + magenta + black |
| c1 | m1 | y1 | k2 | black or |
| c2 | m2 | y2 | k1 | cyan + magenta + yellow |
| c2 | m2 | y1 | k1 | cyan + magenta or |
| c1 | m1 | y2 | k2 | yellow + black |
| c2 | m1 | y2 | k1 | cyan + yellow or |
| c1 | m2 | y1 | k2 | magenta + black |
| c1 | m2 | y2 | k1 | yellow + magenta or |
| c2 | m1 | y1 | k2 | cyan + black |

In TABLE 10, each pair of rows indicates a pair of colors which appear along the border between colors (c1,m1,y1,k1) and (c2,m2,y2,k2), as a result of the corresponding plate misregistration. The resulting colors are in general visually distinct from the two colors (c1,m1,y1,k1) and (c2,m2,y2, k2), and are therefore to be dealt with through the automatic or manually trapping procedure.

Considering the image of FIG. 2 for the case in which the "red" and "blue" colors are to be printed using process colors which are to be rendered by halftone screening, the colors "red" can be taken for example to be made up of 30% magenta and 30% yellow, referred to as 30% Red and represented in the discussion as (0,30,30,0). Similarly, "blue" can be made up of 65% cyan and 65% magenta, referred to as 65% Blue and represented as (65,65,0,0). TABLE 11 shows the possible misregistration colors at the boundary between the 30% Red object 210 and the 65% Blue object 220 under these assumptions.

TABLE 11

TRAP ZONE COLORS FOR EXAMPLE OF FIG. 2

Trap Zone Color Components

| Cyan | Magenta | Yellow | Black | Plates shifted |
|------|---------|--------|-------|----------------|
| 0 | 30 | 30 | 0 | none or |
| 65 | 65 | 0 | 0 | all |
| 65 | 30 | 30 | 0 | *cyan or |
| 0 | 65 | 0 | 0 | *yellow + magenta + black |
| 0 | 65 | 30 | 0 | *magenta or |
| 65 | 30 | 0 | 0 | *cyan + yellow + black |
| 0 | 30 | 0 | 0 | *yellow or |
| 65 | 65 | 30 | 0 | *cyan + magenta + black |
| 0 | 30 | 30 | 0 | black or |
| 65 | 65 | 0 | 0 | cyan + magenta + yellow |
| 65 | 65 | 30 | 0 | *cyan + magenta or |
| 0 | 30 | 0 | 0 | *yellow + black |
| 65 | 30 | 0 | 0 | *cyan + yellow or |
| 0 | 65 | 30 | 0 | *magenta + black |
| 0 | 65 | 0 | 0 | *yellow + magenta or |
| 65 | 30 | 30 | 0 | *cyan + black |

From TABLE 11 it can be seen that many possible misregistration effects can result in new colors rendered in the TRAP ZONE, indicated with (*) in the table, which are distinct from the 30% Red color of object 210 and the 65% Blue color of object 220.

Figure 17A:
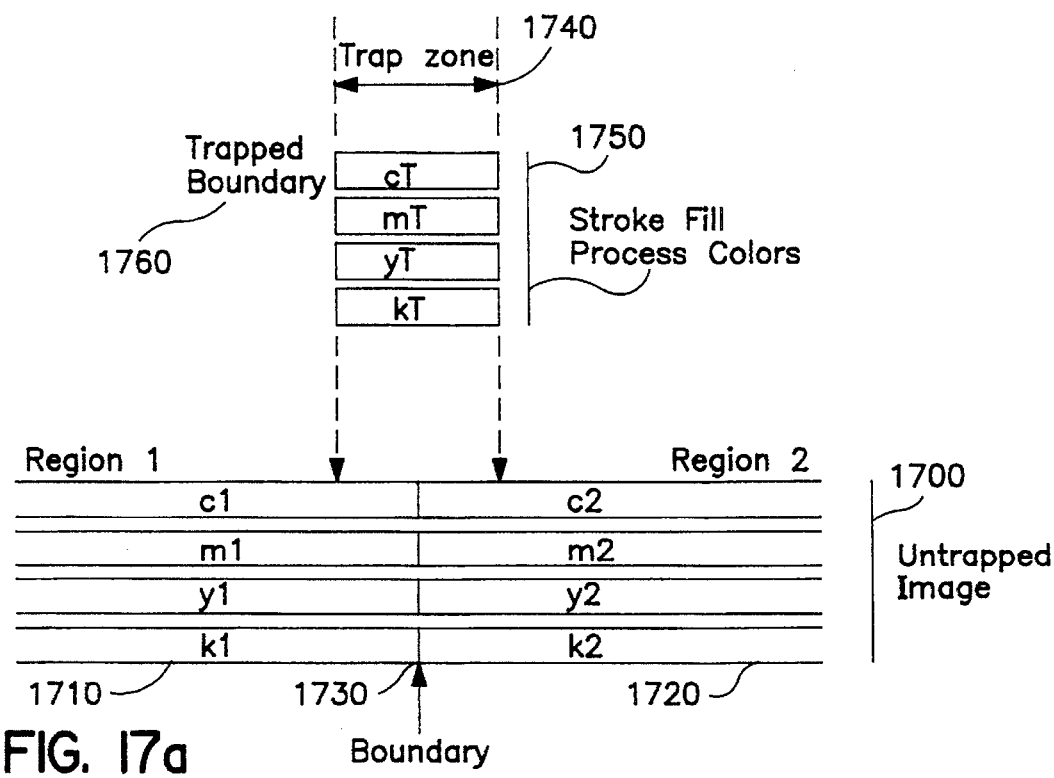
FIG. 17A and 17B illustrate the logical result of superposition of a trap boundary specified with process colors and the resulting color planes when rendered and separated.
Figure 17B:
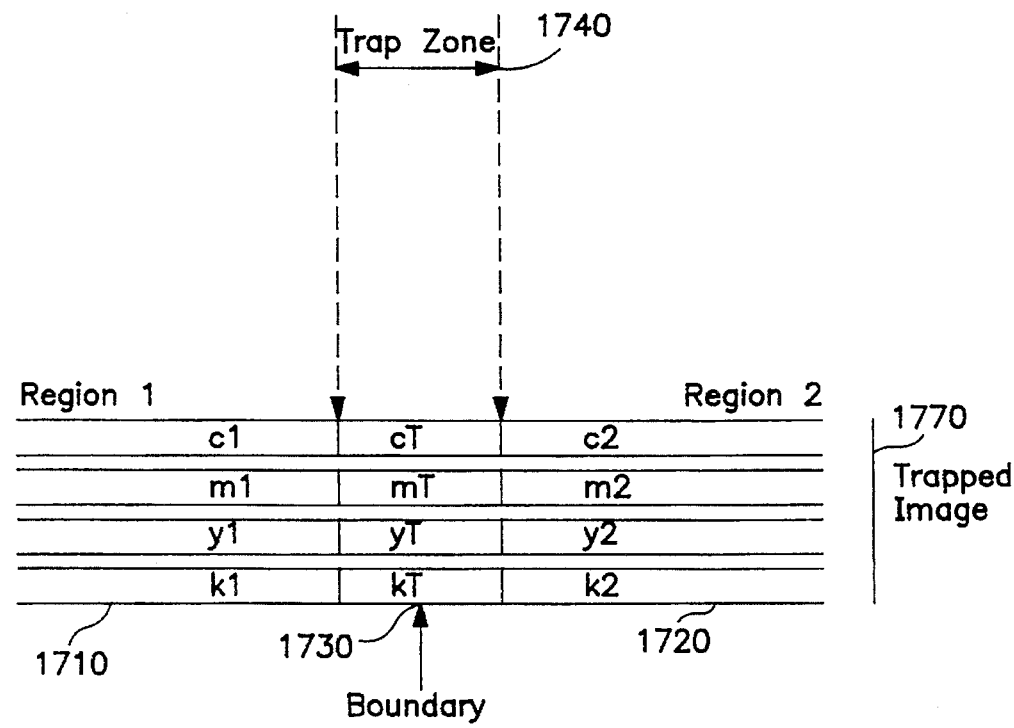

Specification of a trap for a BOUNDARY MAP line segment using process colors to fill the stroke associated with the line segment is similar to that of the spot color examples given previously. FIG. 17A and 17B illustrate the effect of specifying a trap fill color in terms of the PROCESS PRIMARY COLORS cyan, magenta, yellow and black, and the result when rendered as four separations. In FIG. 17A, the logical view of the process is shown, corresponding to the superposition of the TRAPPING MAP 1760 upon the untrapped image 1700 at the boundary 1730 between one region of color (c1,m1,y1,k1) 1710 and a second region of color (c2,m2,y2,k2) 1720 For a trap fill color (cT,mT,yT,kT) 1750 with non-zero percentages for the components, the effect is that of replacing the corresponding components within the TRAP ZONE 1740 projected upon the rendered color separations of the trapped image 1770, as shown in FIG. 17B.

In the preferred embodiment of the invention, which uses PostScript output processing and its associated imaging model, the trapping operations available for non-zero values of cT, mT, yT, and kT assume that the primary "inks" of the image rendering (output processing) procedure are opaque. The trapping operations include the following:

1. Specifying the value of (cT,mT,yT,kT) as either (c1, m1,y1,k1) or (c2,m2,y2,k2) thereby effecting a spread of the corresponding color by the half-width of the TRAP ZONE, with equivalent results, singly or in combination, with the other trap fill colors; or, 2. Specifying the value of (cT,mT,yT,kT) as another set of component values, thereby introducing a new color into the TRAP ZONE, with equivalent results, singly or in combination, with the other trap colors.

Figure 18A:
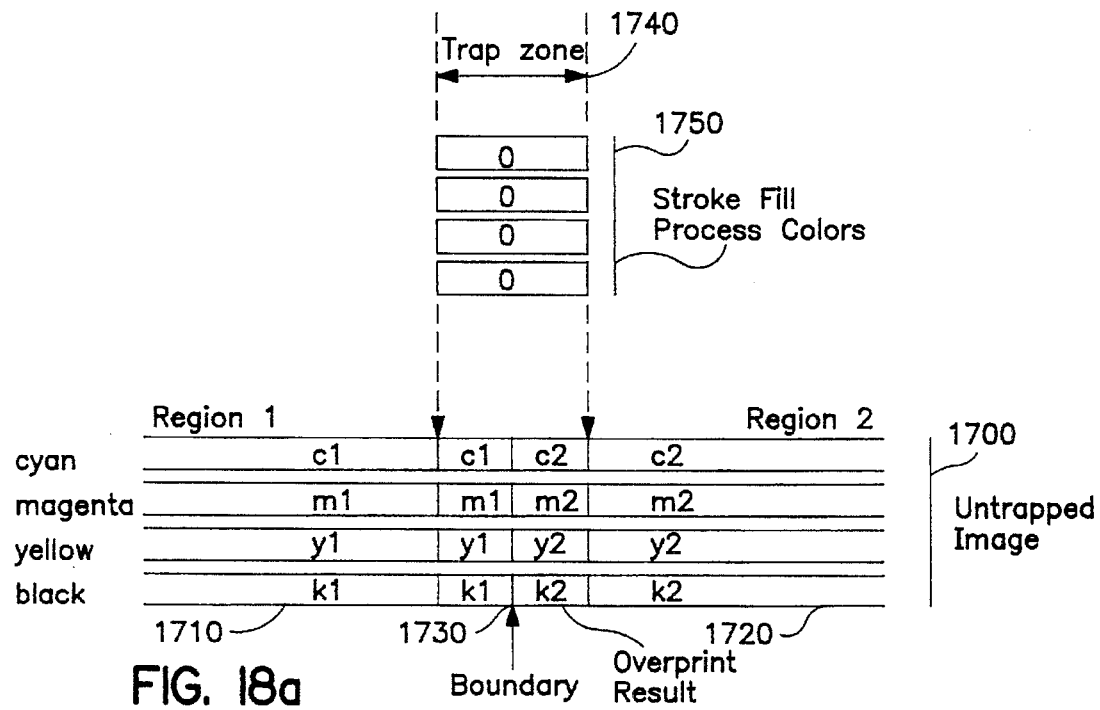
FIG. 18A and 18B illustrate the result of fill with overprint vs. fill with knockout using the example of FIG. 17A and 17B.
Figure 18B:
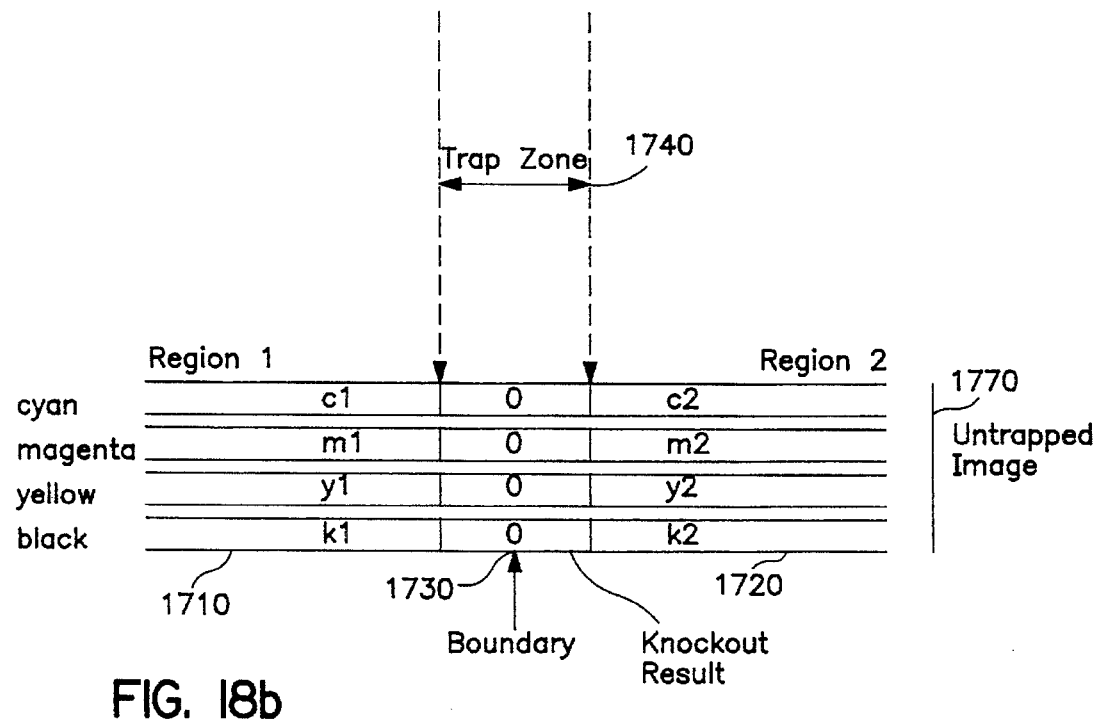

If zero-percentage values are used for any of the trap fill PROCESS PRIMARY COLORS cT, mT, yT or kT, two results are possible shown in FIG. 18A and 18B. For simplicity in the drawings of FIG. 18, all trap colors 1750 are shown with zero values, although it is to be appreciated that the effects shown can be combined with those described previously for FIG. 17.

For the PostScript imaging model used in the preferred embodiment of the invention, the possible operations for this (zero percentage) case are:

1. Fill with overprint, as shown in FIG. 18A, in which the trap is assumed to be "transparent" for the component ink color, leaving any previously rendered values unchanged. This the "no-trap" fill option, and is equivalent to not specifying a trap color for the process color ink so filled. Specifying a trap stroke color 1750 as (0,0,0,0) with overprint is logically equivalent to not specifying any trap at all for the boundary under consideration; or, 2. Fill with knockout, as shown in FIG. 18B, in which the trap is assumed to remove any previously existing values of the component ink color for the colors so filled. Specifying a trap stroke color 1750 as (0,0,0,0) with knockout is logically equivalent to stroking the boundary to the width of the TRAP ZONE with the color of the "paper" on which the image is to be printed.

An example of possible trapping operations for two process color regions wherein one color (c1,m1,y1,k1) is spread into the other (c2,m2,y2,k2) is shown in TABLE 12. Each color component spread operation is achieved by filling the trap fill color by the corresponding component. A "—" in the table indicates no trap for that component (equivalent to a 0% trap color of the corresponding component and overprint). A corresponding set of spread operations exist for spreading the second color into the first. In addition to those shown, other effects can be achieved by offsetting the TRAP ZONE, or filling with reduced color percentages for the PROCESS PRIMARY COLORS specified for the trap. Accordingly, it is recognized that many possible color combinations can be achieved in the specification of the trap.

TABLE 12

BASIC TRAPPING OPERATIONS FOR
TWO PROCESS COLOR REGIONS

Trapping operation by Color

| Cyan | Magenta | Yellow | Black | Plates affected |
|------|---------|--------|-------|-----------------|
| — | — | — | — | none |
| — | — | — | k1 | black |
| — | — | y1 | — | yellow |
| — | — | y1 | k1 | yellow + black |
| — | m1 | — | — | magenta |
| — | m1 | — | k1 | magenta + black |
| — | m1 | y1 | — | magenta + yellow |
| — | m1 | y1 | k1 | magenta + yellow + black |
| c1 | — | — | — | cyan |
| c1 | — | — | k1 | cyan + black |
| c1 | — | y1 | — | cyan + yellow |
| c1 | — | y1 | k1 | cyan + yellow + black |
| c1 | m1 | — | — | cyan + magenta |
| c1 | m1 | — | k1 | cyan + magenta + black |
| c1 | m1 | y1 | — | cyan + magenta + yellow |
| c1 | m1 | y1 | k1 | cyan + magenta + yellow + black |

The operations shown above are given for the example of the 30% Red object and 65% Blue object discussed previously in TABLE 13. Only those operations affecting non-zero color values are shown.

TABLE 13

BASIC TRAPPING OPERATIONS FOR
EXAMPLE OF FIG. 2

Trapping operation by Color

| Cyan | Magenta | Yellow | Black | Plates affected |
|------|---------|--------|-------|-----------------|
| — | — | — | — | none |
| | | | | "30% Red" Spreads |
| — | — | 30 | — | yellow |
| — | 30 | — | — | magenta |
| — | 30 | 30 | — | magenta + yellow |
| | | | | "65% Blue" Spreads |
| — | 65 | — | — | magenta |
| 65 | — | — | — | cyan |
| 65 | 65 | — | — | cyan + magenta |

Figure 19A:
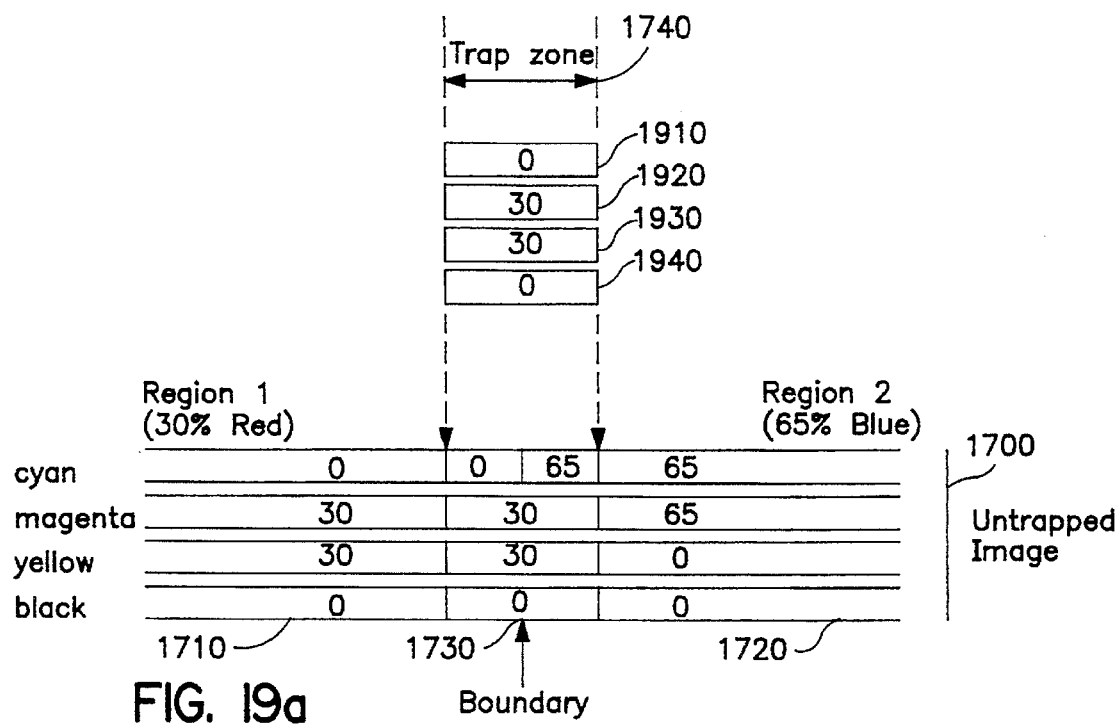
FIG. 19A and 19B illustrate trapping by foreground spreading magenta and yellow, applied to the example image of the image of FIG. 2A and 2B.
Figure 19B:
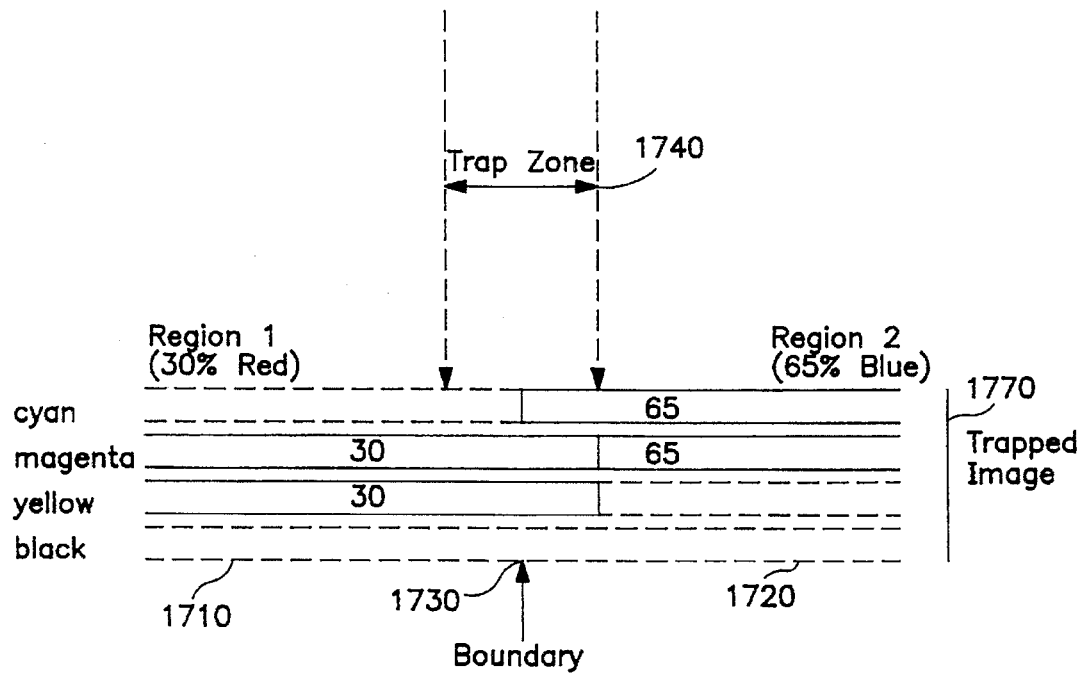

FIG. 19A and 19B show the results of applying process fill colors to the boundary between the first color region 1710 (30% Red) and the second 1720 (65% Blue) for the case in which magenta and yellow are to be spread from region 1 to region 2. Since the cyan component is not to be trapped, the cyan trap fill color 1910 of FIG. 19A is specified as 0%. (with overprint). The corresponding magenta component 1920 and yellow component 1930 are are filled with region 1 equivalents, effecting a spread. The black component 1940 is also shown as 0% since in our example no black separation exists. The results of this operation are shown in FIG. 19B.

SECONDARY MISREGISTRATION EFFECTS

Figure 20A:
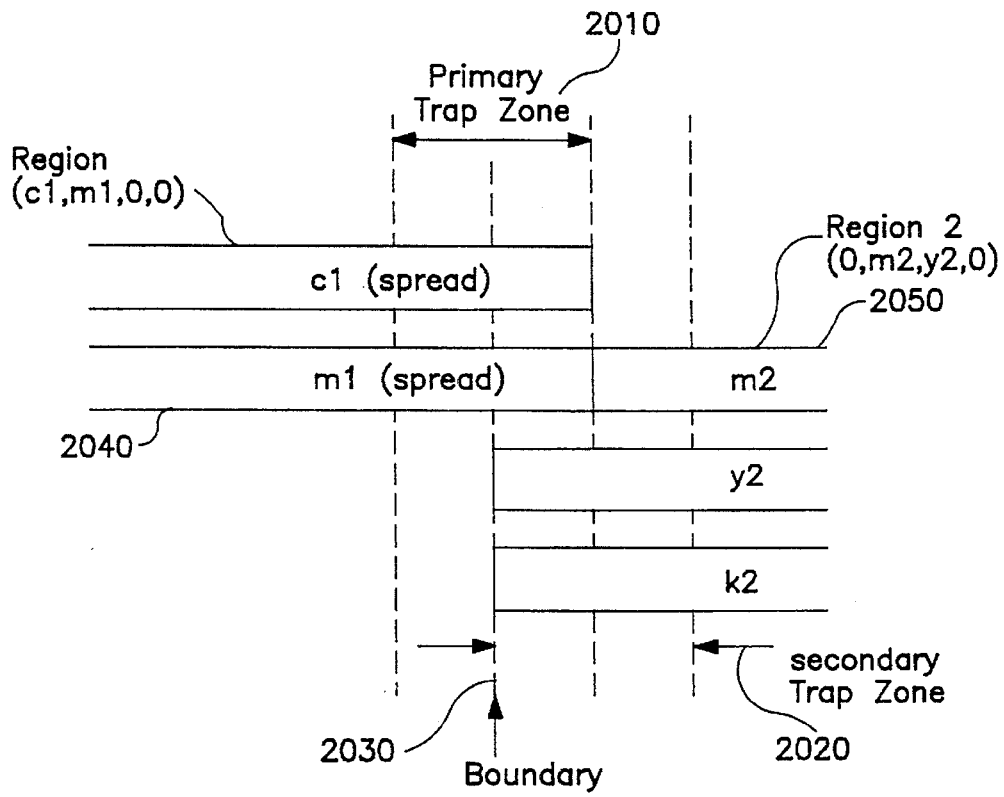
FIG. 20A and 20B illustrate the effects of secondary plate misregistration for a trapped image.
Figure 20B:
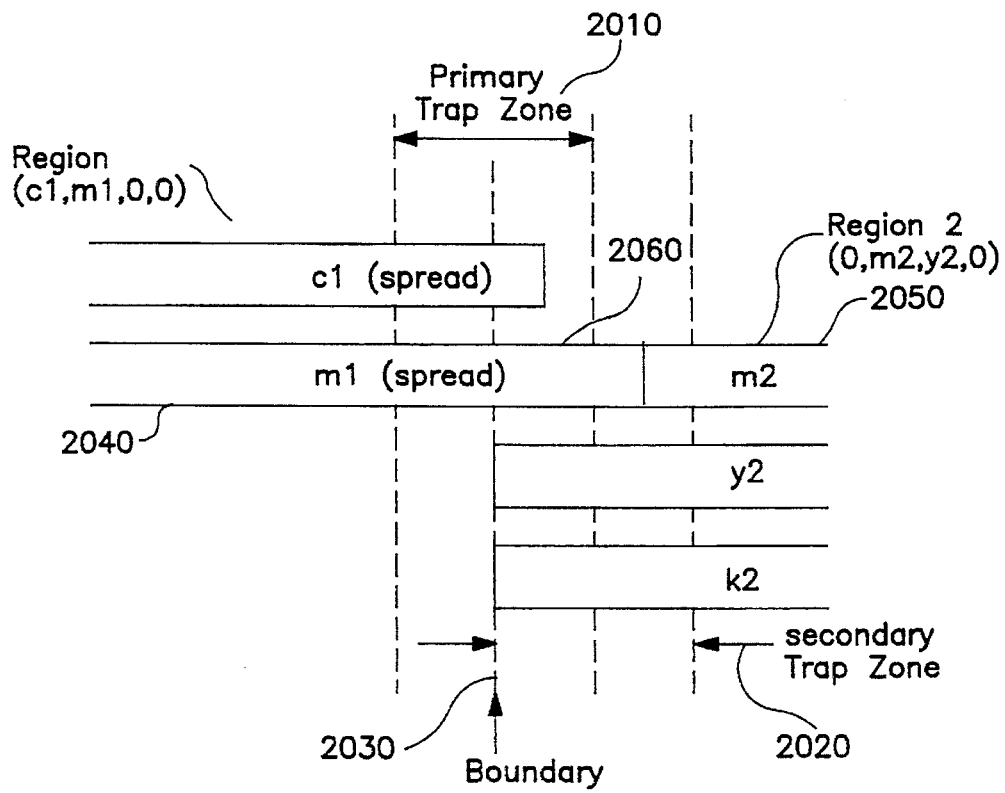

FIG. 20A and 20B illustrate the effect of secondary misregistration effects. The PRIMARY TRAP ZONE 2010 is the zone of in which misregistration effects of the untrapped image are to be seen, and is of width w equal to the tolerance applicable to such misregistration. The zone in which misregestration effects for trapped color components can be observed is referred to as the SECONDARY TRAP ZONE 2020. This zone is of the same width w as that of the PRIMARY TRAP ZONE width 2010 and extends from the boundary 2030 between the two color regions 2040, 2050. The term "Secondary" refers to the fact that the misregistration effects described here are generally less significant if a "good" trap has been specified, i.e., the new colors which result are closer to those which exist in the PRIMARY TRAP ZONE and the abutting regions. In the example of FIG. 20, the cyan and magenta colors of Region 1 2040 are spread in the direction of Region 2 2050, with a new color 2060 appearing along the boundary 2030 in the direction of Region 2 2050. Although this new color (c1,m1,y2,k2) is not a color of either bounding region, it has been chosen to minimize its visual appearance along the border between the regions. FIG. 20A shows the result in perfect plate alignment. FIG. 20B shows the effect of shifts both in the cyan and magenta plates, within the second order zone. The result of this shift is the appearance of new colors in the second order zone 2020, as shown in TABLE 14.

TABLE 14

POSSIBLE COLORS WITHIN SECONDARY TRAP ZONE

2nd Order Zone Components

| Cyan | Magenta | Yellow | Black | Plates shifted |
|------|---------|--------|-------|----------------|
| c1 | m1 | y2 | k2 | none or |
| — | m2 | y2 | k2 | all |
| c1 | m1 | y2 | k2 | cyan (towards Region 1) |
| — | m1 | y2 | k2 | and/or |
| — | m2 | y2 | k2 | magenta (towards Region 2) |
| c1 | m1 | y2 | k2 | cyan (towards Region 2) |
| c1 | m2 | y2 | k2 | and/or |
| — | m2 | y2 | k2 | magenta (towards Region 1) |

The information of TABLE 14 completes the picture of potential misregistration effects when a trap has been specified, for user interface display and trap evaluation, as will be discussed further below.

TRAP STROKE CHARACTERISTICS

Figure 21:
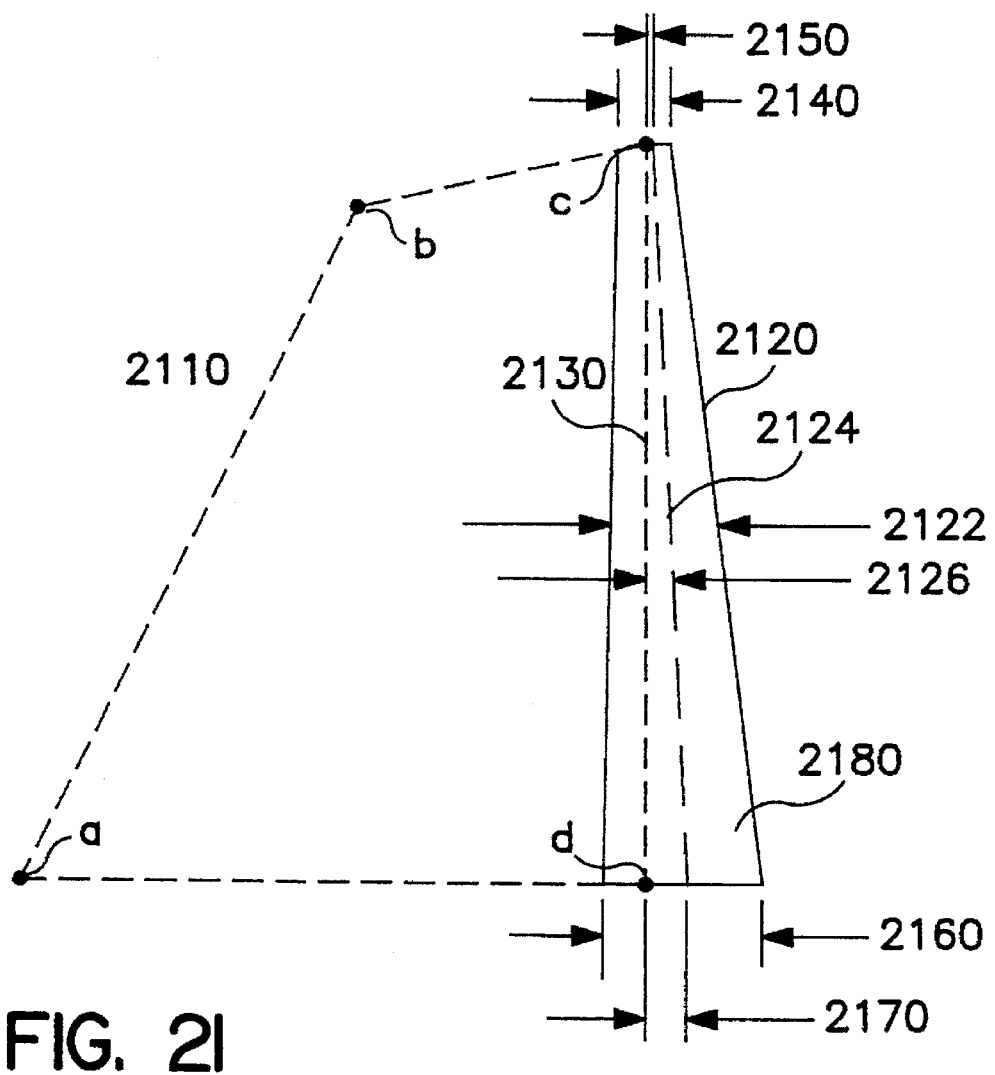
FIG. 21 provides definitions for trap stroke parameters which can be supplied to specify a trap along a single boundary of an object.

FIG. 21 illustrates the parameters which are used specification of trap stroke characteristics (width and offset). In the most general case, an object 2110 consisting of four vertices a, b, c, and d is shown with (exaggerated) variable size ranging from large along segment d-a to small along the segment b-c. A trap 2120 is shown along the boundary 2130 corresponding to segment c-d between vertices c and d. For manual trap specification, a trap width 2140 and offset 2150 are specified for the starting vertex c making up the trap 2120, and a corresponding width 2160 and offset 2170 for the ending vertex d of the trap 2120. In this manner, a continuously variable stroke width 2122 and offset 2126 can be achieved along the stroke 2120 by which the trap is rendered. Although the usual case is for the trap width and offset to be constant along a boundary, provision exists for the options of FIG. 21 to allow for refinement of stroke characteristics based upon user aesthetic judgement or automatic methods based upon object size.

AUTOMATIC TRAP SPECIFICATION

Automatic trap selection and specification is achieved through the evaluation of a weighted sum of scores obtained by one or more of separate methods selected for the application, where the weights assigned to each ranking method can be fixed for the application, previously established and built-in according to "experts" in the application, or user-specified on the fly or by installation from a named dataset stored on disk. The final "score" assigned to each possible trap operation is obtained from the equation $$\text{Score} = \Sigma_i \text{Weight}_i * \text{Rank}_i \quad (1)$$

where $\text{Rank}_i$ is the score obtained by using the i-th ranking method, and $\text{Weight}_i$ is the normalized weight assigned to the i-th method according to user-specified options.

In the preferred embodiment of the application, seven ranking methods are used, based upon the 1976 CIE LUV color space. Within this color space the coordinates $L^*$, $u^*$ and $v^*$ designate any color capable of human perception. It is noted for the fact that a given linear distance anywhere within the space corresponds to the same perceived visual difference. It will be appreciated that other methods can also be used for ranking.

The ranking methods of the preferred embodiment are based upon distances measured in the CIE LUV color space and therefore have a low score when the visual effects of a candidate trap are best, and a high score when they are worst. They are described as follows:

1. For each misregistration color possible with a candidate trap, determine the minimum distance in the CIE LUV color space from each bounding color, with the score the maximum of that set of values, i.e., a low ("good") score occurs when each of the misregistration colors is close to one or the other of the bounding colors;

2. Given a candidate spread trap color, the score is the distance in CIE LUV space of the color into which it is spread, i.e., a "good" score occurs when the trap zone color is a close match to the color of the object into which the spread occurs;

3. For each misregistration color, determine the algebraic difference in luminescence ($L^*$) from each of the bounding colors, with the score the maximum (positive or negative) value of that set, i.e., a "good" score indicates relatively darker misregistration colors, and a "bad" score relatively lighter (more noticeable) misregistration colors;

4. For each misregistration color, take the absolute value of the difference in luminescence ($L^*$) from each bounding color, with the score the maximum (absolute) value of that set, i.e., a "good" score is based upon lightness differences instead of differences in hue and saturation;

5. Determine the luminescence ($L^*$) of each misregistration color, with the score the maximum value of this set, i.e., a "good" score indicates dark misregistration colors, and a "bad" score indicates light (more noticeable) misregistration colors;

6. Determine the luminescence ($L^*$) of the two bounding colors and assign a score value equal to the absolute difference in $L^*$ when a dark color is spread into a light color, or zero when a light color is spread into a dark color, effecting a penalty for spreading a dark color into a light color and thereby causing more noticeable distortion of the shape of the light color region; and, 7. Determine the rank as the highest percentage of yellow in a misregistration color, i.e., a "good" ranking by this method indicates less yellow in a misregistration color since the YELLOW PROCESS PRIMARY COLOR is the lightest and therefore more noticeable.

From the list of possible trap specifications for a color combination, one is selected according to the scoring procedure, by assigning each trap (including no trap at all) a score and choosing the trap with the lowest score. The resulting score for each trap is in general a combination of the possible ranking scores obtained by any one of the separate ranking methods.

Weights are chosen for the scores obtained by the individual ranking methods by evaluation of many color combinations and choosing the most satisfactory traps, hereinafter referred to as CALIBRATION TRAPS for these combinations. The selection can be made by "experts", or by users according to criteria specific to their own application. The scores obtained for each of the CALIBRATION TRAPS are then evaluated for each ranking method.

The CALIBRATION TRAP data forms the basis for application of a regression technique by which an optimal set of weights can be chosen. First, an initial database of "good" and "bad" traps is saved in the application environment. Each database entry holds the color of each boundary region, the trap specification, including trap fill color and spread direction. From this database, a set of weights can be calculated using the least squares solution of unsolvable systems (see, for example, "Matrix Theory", by J. N. Franklin, Prentice Hall, 1968, pp 50–55) to choose weights forming the best match to these traps. In the preferred embodiment, the approach is to compute the ranks of each trap and assign a score of +100 for each CABLIBRATION TRAP (subjectively) judged "bad", and -100 for each CALIBRATION TRAP judged "good". The least squares solution method is then used to choose weights providing the best match to these scores.

Additional "good" and "bad" traps can be added at any time to this database. As a result, the weights can be specific to certain types of application. Furthermore, the method is adaptive, i.e., it "learns" from experience, becoming more accurate over time, in its prediction of "good" traps (viewed from the specific application perspective), as CALIBRATION TRAP data is added to the database. The user interface provides for adding a current trap specification to the database on a one-time or permanent basis, allowing a new set of weights to be calculated and assigned a user-given name for later recall, and recalling a previously saved set of weights referred to by the user-given name.

In addition to the above procedures for automatic trap specification, a set of trap conditions and resulting trap specifications can be "forced" as an option, thereby overriding the selection based upon the score resulting from the weighted ranking procedure described above. In this case, a given combination of bounding colors is compared with a user-defined table, and if the combination is listed in the table, the trap specifications given for the combination are used. Otherwise, the trap operation receiving the best score by the weighted ranking is selected.

TRAPPING USER INTERFACE

Figure 22:
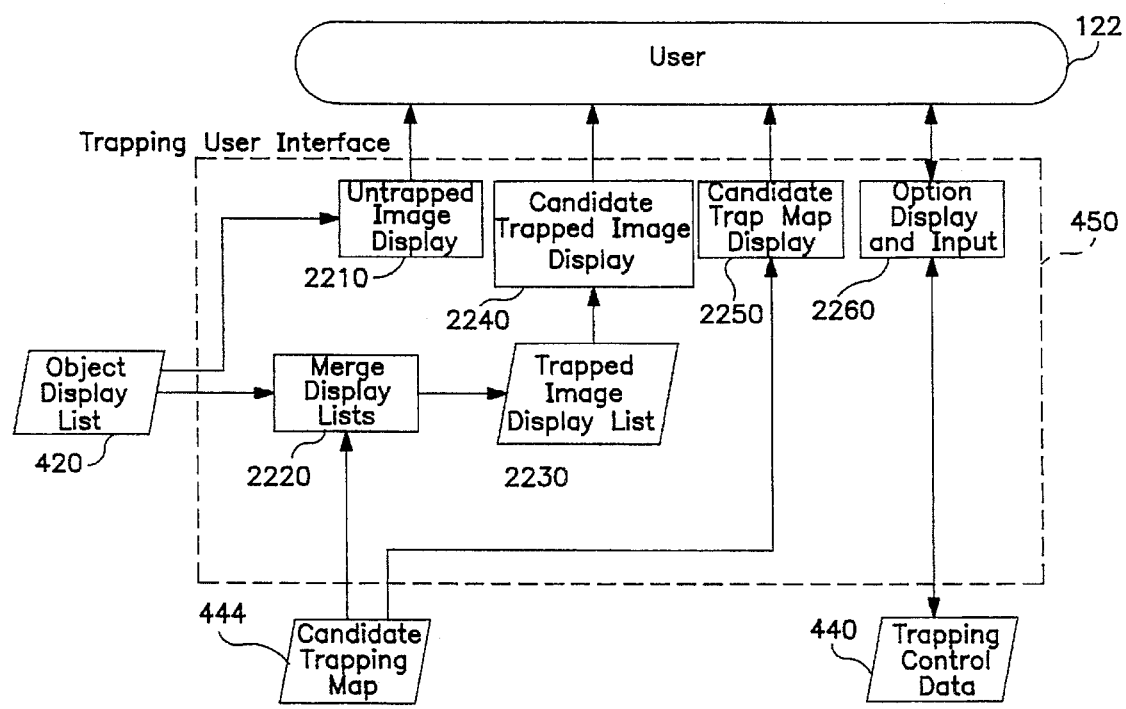
FIG. 22 is a block diagram of the user interface to the trapping system

FIG. 22 shows the processing steps of the trapping user interface 450 of the preferred embodiment of the invention, and shown previously in FIG. 4. A CANDIDATE TRAPPING MAP 444 can be combined with the original object DISPLAY LIST 420 by merge procedure 2220, in which the candiate TRAPPING MAP is placed at the end of the object DISPLAY LIST so as to be superimposed upon the untrapped image when displayed. The result is a trapped image DISPLAY LIST 2230 which can be displayed as a candidate trapped image 2240 on the user workstation display console. Alternate display options available to the user 122 are the direct display of the untrapped image 2210 obtained from the object DISPLAY LIST 420, or of the CANDIDATE TRAPPING MAP IMAGE 2250 obtained from the CANDIDATE TRAPPING MAP DISPLAY LIST 444.

The option display and input module 2260 provides an interface for keyboard entry as well as by mouse, pen, etc., entry and selection operations (referred to herein as MOUSE PICKS) with a graphical display providing for user display and modification of all parameters used in the processing environment. The parameters so viewed or modified are stored in the trapping control data store, which is used for configuration of the trapping system or specification of traps under automatic or manual control.

Figure 23:
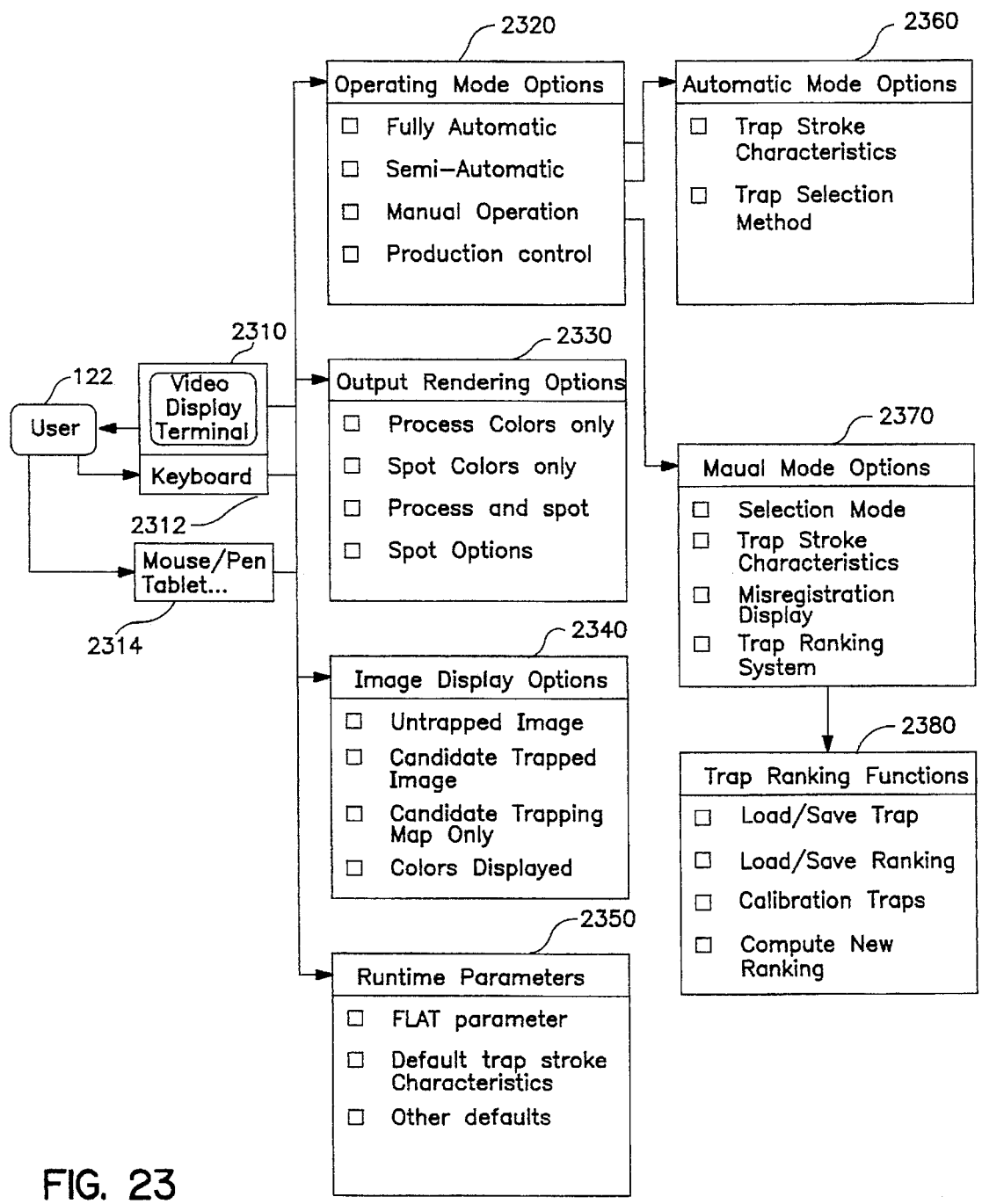
FIG. 23 depicts the view of the trapping system as seen by a user.

The user's view of the production environment of the trapping system as implemented in the preferred embodiment of the invention is shown in FIG. 23, in which the user 122, working at a video display terminal 2310 with keyboard 2312, pointing device 2314 (e.g., mouse, pen with tablet, etc.) controls a hierarchy of mode selection options, parameters, and interactive functions. The parameters which can be specified in this environment, together with the option selections and functions controlled are summarized in tables below, and detailed for the manual mode interaction in FIG. 24.

SYSTEM CONFIGURATION OPTIONS

The system configuration parameters specific to the operation of the trapping system permit selection of operating modes (panel 2320 of FIG. 23), allowing fully automatic operation for a production environment with no operator intervention, completely manual operation, or a semi-automatic mode in which automatic trapping methods are applied, but each CANDIDATE TRAPPING MAP is viewed and accepted by an operator before output. The automatic mode options 2360 and manual mode options 2370 can be accessed depending upon the mode selection 2320.

The set of system configuration parameters is given in summary form in TABLE 15.

TABLE 15

TRAPPING SYSTEM CONFIGURATION PARAMETERS

| Parameter | Option | Description |
|---|---|---|
| Operation Mode | Fully Automatic | No operator review or interaction with processing other than start and stop. |
|  | Semi-automatic | Automatic with user view of each candidate trapping map as generated, with option to override and/or to preserve manual changes. |
|  | Manual | Completely manual specification of traps. |
| Output Rendering | Process Separations | Select one or more process separations from the set: cyan, magenta, yellow, black. |
|  | Spot Colors | Specify spot colors instead of or in addition to process colors |
|  | Spot Options | Set of processing options for spot colors |
| Image Display | Untrapped Image | Show the original structured graphic image without any traps applied. |
|  | Candidate Trapped Image | Show the original image with the candidate trapping map superimposed. |
|  | Candidate | Show the candidate trapping map only, |

TABLE 15-continued

TRAPPING SYSTEM CONFIGURATION PARAMETERS

| Parameter | Option | Description |
|---|---|---|
|  | Trapping Map | without the original image. |
|  | Colors Displayed | Select some or all separations to show, or grey scale. |
| Runtime Parameters | FLAT Parameter | Maximum error of line segment to be generated to represent an arc of a curve, specified in output resolution elements. |
|  | Default Values | Default trap stroke characteristics and other parameters. |

In addition to operating mode options 2320, general system configuration options include specification of output rendering options 2330, selection of the image format to be displayed for trap viewing, selection or specification 2340, and the specification of fixed parameters 2350. The flatness parameter FLAT, described previously in FIG. 13 and TABLE 4 with reference to the BOUNDARY MAP processing time, is of importance since it determines the maximum error (in output resolution pixels) when converting curved lines of the source image into straight line segments for computation of the boundary map.

Other parameters specified in the system configuration options include units for linear coordinates or measures, printing plate shift tolerance to be used for determination of PRIMARY and SECONDARY TRAP ZONE effects.

AUTOMATIC OPERATION MODE OPTIONS

If automatic or semi-automatic mode operation is selected in FIG. 23, the system operates with little or no operator intervention other than initial specification of the automatic mode options 2360 of FIG. 23, and production control functions such as startup, initialization, file management, etc. The parameters specified for automatic or semi-automatic mode operation are given in TABLE 16.

TABLE 16

AUTOMATIC OPERATION MODE PARAMETERS

| Parameter | Option | Description |
|---|---|---|
| Trap Stroke Characteristics | Width | Fixed width to be applied to strokes of all traps generated automatically. |
|  | Overprint | Use of overprint option where applicable |
| Trap Selection method | Named set of Ranking Weights | Previously saved set of trap weights for the available ranking methods, accessible by a user-given name. |
|  | Named set of Forced traps | Previously saved set of bounding color pairs with trap specifications, accessible by a user-given name. |

MANUAL OPERATION MODE OPTIONS

Figure 24:
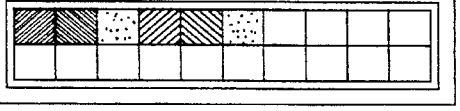
FIG. 24 illustrates the manual trap selection user interface.

The manual operation mode options 2370 of FIG. 23 include the setting the selection mode, trap stroke characteristics, misregistration display options, and access to the trap ranking functions 2380, to be described further below. An example of a graphical user interface interaction panel is shown in FIG. 24, which will illustrate many of the manual control provisions of the preferred embodiment of the invention. It is to be appreciated that the layout of interaction elements on the panel of FIG. 24 is not intended to conform to any specific graphical user interface standard, nor does it provide an exclusive set of functions supported by the invention. The parameters set and option values for the manual mode selection 2370 are summarized in TABLE 17. It is to be noted that the relevance of some options indicated in TABLE 17 for Trap Stroke Characteristics and Misregistration display are dependent upon the chosen selection mode.

TABLE 17

MANUAL OPERATION MODE PARAMETERS

| Parameter | Option | Description |
| --- | --- | --- |
| Selection Mode | Segment | Individual segment of a multi-segment boundary between adjacent color regions. |
| | Boundary | All segments of a single boundary between adjacent color regions. |
| | Object | All boundaries of a single color region. |
| | One Color | All boundaries bordering on a specified color regardless of the other color. |
| | Color Pair | All boundaries forming a border between a specified pair of colors. |
| | Image | The entire image. |
| Trap Stroke Characteristics | Width | Width of trap(s) for selection above. |
| | Direction | Direction of trap(s) for selection above. |
| | Offset | Offset of trap(s) for selection above. |
| | Shape | Shape of trap(s) for selection above. |
| | Fill Color | Fill color for trap(s) for selection above, as a tuple for all separations being used. |
| | Overprint | True if trap color is "transparent". |
| Misregistration Display | Display Option | Untrapped image, candidate trapped image, primary trap zone, secondary trap zone, all selected traps. |
| | Planes Shifted | On/off toggles for each color separation being used, singly or in combination. |

The selection mode panel 2410 provides mutually exclusive selection of one of six methods of identifying the part of the image to which a trap operation is to take place, ranging from a single element of a multi-element boundary between color regions to all boundaries of the entire image. Once a choice of selection mode has been made with the panel 2410, a MOUSE PICK on a segment, boundary, or color region selects a subset of all the boundaries of the BOUNDARY MAP for analysis and operation. In the example of FIG. 24, "single boundary" has been chosen, indicating that a MOUSE PICK on a boundary between color regions will select all segments making up that boundary. The choices "all boundaries for region" and "all boundaries bordering color" indicate that MOUSE PICKS on a region of color will select all boundaries enclosing the region in the first case and all boundaries enclosing all regions of the image having the same interior color as the region picked in the second case. The choice "all boundaries between colors" indicates that a MOUSE PICK on a boundary between two colors will select all boundaries in the image between the same set of colors. Finally, the choice "entire image" will select all boundaries of the image.

The trap specification panel 2420 of FIG. 24 allows an existing trap to be displayed or modified, showing the left and right colors for the boundary to which the trap is to be applied, the direction of spread, and the color to be used. The direction arrows can be toggled (left, right, or "off" indicating no trap color specification) on a separation by separation basis, with the default trap color the full value of the color from which a spread occurs. Default values for trap width and offset (obtained from the runtime parameters specification 2350 of FIG. 23) are also used. Election of overprint allows an under-color separation to show through if a zero value is specified for any fill color component corresponding to the same separation.

A set of control buttons 2430 through 2438 allow manipulation of the information being displayed for a trap specification. If "Auto Trap" 2430 is picked, the trap specification is chosen using the operative automatic trap method (obtained from the Automatic Parameters selection panel 2360 of FIG. 23.). If "Manual Trap" 2432 is picked, the trap specification is that entered by the operator, or loaded from a data set using the "Load Trap" 2434 control function. Any information entered or modified in the Trap Specification panel 2420 can be saved with a user given "Trap Name" using the "Save Trap" 2436 control function, and thereby made available for later recall using the "Load Trap" 2434 control function.

Whenever a trap selection has been made, all possible misregistration colors are shown in a color icon array 2440, according to the chosen misregistration display option 2442, for a selected combination of plate shifts 2444. The misregistration display option selection 2442 enables the effect of a trap to be observed quickly by toggling through the mutually exclusive options (e.g., to view secondary misregistration colors in comparison to the untrapped image). The "Plates Shifted" selection 2444 allows the effect of misregistration of any given printing plate or any combination of those being used, in any direction of plate shift within the preset misregistration tolerance value. In the example, the color icon array 2440 shows all misregistration colors for the untrapped image due to shifts of the cyan and black plates.

The Trap Ranking Analysis panel 2450 provides an evaluation of the trap specified in the panel 2420 using the currently selected set of weights. In the example, the seven methods described previously have separately generated ranks of 40,32,16,72,12,85, and 0. The currently selected set of weights, named in the example "Standard Weights", assigns weights of 0.20,0.05,0,0.25,0.50.0, and 0 to these ranks, arriving at a score of 33.60 for the trap specified in the panel 2420.

TRAP RANKING FUNCTIONS AND OPTIONS

The management of the data required to support the automatic trap selection method 2380 is described as follows, with function summaries given in TABLE 18. In the preferred embodiment of the invention, individual traps specified using the panel 2420 of FIG. 24 can be assigned user given names, and saved within a TRAP SET identified by a file name, using the control button 2436 as described previously. In the example of FIG. 24, the displayed trap has been identified as "Blue-Red Spread" and belongs to a set stored in the TRAP SET identified with the file name "StdTraps.db". At a later time, this trap can be loaded using the control button 2434.

TABLE 18

TRAP-RANKING FUNCTIONS

| Function | Option | Description |
| --- | --- | --- |
| Load/Save Trap | Name of Trap | User-given name of a trap specification to be loaded from or saved to a dataset. |
| | Name of Trap Set | User-given name of the dataset from which a trap is to be loaded or to which it is to be saved. |
| Load/Save Ranking | Name of Set | User-given name of set of weights to be loaded or saved from a dataset. |
| Display Calibration Traps | Name of Database | User-given name of database of calibration traps to be displayed, trap by trap with set of weights previously computed. |
| | Add Trap | Add the currently displayed trap to the database of calibration traps. |
| | Delete Trap | Remove a trap from the database of calibration traps. |
| Compute New Ranking | Name of Database | User-given name of database of calibration traps to be used for computation of a new set of weights using the regression method. |
| | Use Trap | True if the current trap specification is to be used with the regression computation. |

In the example interface of FIG. 24, access to the trap ranking database summarized in TABLE 18 is accomplished using the "Trap Ranking" control 2438 which allows the trap specified to be designated as a "good" trap or "bad" trap, optionally added to the CALIBRATION TRAP data base, with the added option of computing a new ranking method using the least-squares regression method described previously. Multiple CALIBRATION TRAP data-bases can be maintained within the system, and any trap specification can be added to or removed from an existing database. Creation, modification, moving, deletion, etc. of CALIBRATION TRAP databases involves standard file management procedures.

Having described in detail a preferred embodiment of my invention, it will now be apparent to those skilled in the art that numerous modifications can be made therein without departing from the scope of the invention as defined in the following claims.

What I claim is:

1. A method for automatic trap selection comprising the steps of:
    (A) ranking CANDIDATE TRAPS by a plurality of methods with an overall score which represents the sum of weighted ranks obtained by said plurality of methods with the weights applicable to said overall score being previously determined; and,
    (B) using said overall score as the basis for automatic selection among said CANDIDATE TRAPS.

2. The method of claim 1 wherein the minimum value of said overall score is the basis for automatic selection among said CANDIDATE TRAPS.

3. The method of claim 2 wherein one of said plurality of methods for ranking CANDIDATE TRAPS comprises the following steps:
    (A) determining for each CANDIDATE TRAP the minimum distance in the CIE LUV color space of each possible misregistration color from each boundary color; and,
    (B) using the maximum of the set of distances so determined as the rank associated with said one of said plurality of methods for said CANDIDATE TRAP.

4. The method of claim 2 wherein one of said plurality of methods for ranking CANDIDATE TRAPS comprises the following steps:
    (A) determining for each CANDIDATE TRAP the the distance in the CIE LUV color space of the color of the CANDIDATE TRAP from the color into which it is spread as the rank associated with said one of said plurality of methods for said CANDIDATE TRAP.

5. The method of claim 2 wherein one of said plurality of methods for ranking CANDIDATE TRAPS comprises the following steps:
    (A) determining for each CANDIDATE TRAP for each misregistration color the algebraic difference in luminescence from each of the bounding colors; and
    (B) using the maximum (positive or negative) value of the above set for the rank associated with said one of said plurality of methods for said CANDIDATE TRAP.

6. The method of claim 2 wherein one of said plurality of methods for ranking CANDIDATE TRAPS comprises the following steps:
    (A) determining for each CANDIDATE TRAP for each misregistration color the absolute value of the difference in luminescence from each of the bounding colors; and,
    (B) using the maximum (absolute) value of the above set for the rank associated with said one of said plurality of methods for said CANDIDATE TRAP.

7. The method of claim 2 wherein one of said plurality of methods for ranking CANDIDATE TRAPS comprises the following steps:
    (A) determining for each CANDIDATE TRAP the luminescense of each misregistration color for a CANDIDATE TRAP; and,
    (B) using the maximum value of the above set for the rank associated with said one of said plurality of methods for said CANDIDATE TRAP.

8. The method of claim 2 wherein one of said plurality of methods for ranking CANDIDATE TRAPS comprises the following steps:
    (A) determining for each CANDIDATE TRAP the luminescense of the two bounding colors;
    (B) using for each CANDIDATE TRAP in which a dark color is spread into a light color, the abolute difference in luminosity between them as the score for the CANDIDATE TRAP: and,
    (C) using for each CANDIDATE TRAP in which a light color is spread into a dark color, zero as the rank associated with said one of said plurality of methods for said CANDIDATE TRAP.

9. The method of claim 2 wherein one of said plurality of methods for ranking CANDIDATE TRAPS comprises the following steps:
    (A) determining for each CANDIDATE TRAP for each misregistration color resulting from a CANDIDATE TRAP the percentage of yellow; and,
    (B) using the maximum value of this set as the rank associated with said one of said plurality of methods for said CANDIDATE TRAP.

10. The method of claim 1 wherein the maximum value of said overall score is the basis for automatic selection among said CANDIDATE TRAPS.

11. The method of claim 1 wherein the weights can be displayed and modified by an operator.

12. The method of claim 1 wherein the weights may be saved in a data store for later use, and later recalled from said previously saved data store.

13. The method of claim i wherein an operator can display the ranks obtained for any trapping operation applied to selected elements of an image, and can assign weights to a combination of said ranks so as to obtain results of the scoring system which meet particular criteria.

14. The method of claim 1 wherein the weights assigned to each ranking method are determined by a least squares fit procedure based on a database of acceptable and unacceptable CANDIDATE TRAPS.

* * * * *